US012756860B2

(12) United States Patent
Yan et al.

(10) Patent No.: US 12,756,860 B2
(45) Date of Patent: Oct. 6, 2026

(54) METHODS AND DEVICES FOR MOTION STORAGE IN GEOMETRIC PARTITIONING MODE

(71) Applicant: BEIJING DAJIA INTERNET INFORMATION TECHNOLOGY CO., LTD., Beijing (CN)

(72) Inventors: Ning Yan, San Diego, CA (US); Xiaoyu Xiu, San Diego, CA (US); Che-Wei Kuo, San Diego, CA (US); Hong-Jheng Jhu, San Diego, CA (US); Wei Chen, San Diego, CA (US); Xianglin Wang, San Diego, CA (US); Bing Yu, Beijing (CN)

(73) Assignee: BEIJING DAJIA INTERNET INFORMATION TECHNOLOGY CO., LTD., Beijing (CN)

( * ) Notice: Subject to any disclaimer, the term of this patent is extended or adjusted under 35 U.S.C. 154(b) by 0 days.

(21) Appl. No.: 18/991,322

(22) Filed: Dec. 20, 2024

(65) Prior Publication Data

US 2025/0126289 A1 Apr. 17, 2025

Related U.S. Application Data

(63) Continuation of application No. PCT/US2023/025907, filed on Jun. 21, 2023.

(Continued)

(51) Int. Cl.
*H04N 19/543* (2014.01)
*H04N 19/105* (2014.01)

(Continued)

(52) U.S. Cl.
CPC ......... *H04N 19/543* (2014.11); *H04N 19/105* (2014.11); *H04N 19/159* (2014.11); *H04N 19/172* (2014.11)

(58) Field of Classification Search
CPC ............... H04N 19/105; H04N 19/119; H04N 19/159; H04N 19/172; H04N 19/176; H04N 19/423; H04N 19/513; H04N 19/543
See application file for complete search history.

(56) References Cited

U.S. PATENT DOCUMENTS

2016/0277762 A1* 9/2016 Zhang .................. H04N 19/593
2021/0016052 A1 1/2021 Delaney et al.
2021/0058617 A1* 2/2021 Reuze .................... H04N 19/70

(Continued)

FOREIGN PATENT DOCUMENTS

WO 2021061027 A1 4/2021
WO 2021122416 A1 6/2021

(Continued)

OTHER PUBLICATIONS

"Geometric Partitioning Mode in Versatile Video Coding: Algorithm Review and Analysis"—Gao et al., IEEE Transactions on Circuits and Systems for Video Technology; Date of Publication: Nov. 24, 2020. (Year: 2020).*

(Continued)

*Primary Examiner* — Mainul Hasan
(74) *Attorney, Agent, or Firm* — Arch & Lake LLP; Hao Tan; Shen Wang

(57) ABSTRACT

Methods, apparatuses, and non-transitory computer-readable storage mediums are provided for video decoding and encoding. In one decoding method, a decoder obtains at least one motion vector of a first motion vector or a second motion vector, where a coding unit is geometrically partitioned into a first part of a geometric partition and a second part of the geometric partition for prediction in a geometric partitioning mode, and the first motion vector is from the first part and the second motion vector is from the second part. Additionally, the decoder may determine a value of a stored motion vector type based on a blending width, a motion index, and a part index. Furthermore, the decoder (Continued)

may store a motion vector in a corresponding motion field based on the value of the stored motion vector type and the first or second motion vector.

9 Claims, 17 Drawing Sheets

Related U.S. Application Data

(60) Provisional application No. 63/354,230, filed on Jun. 21, 2022.

(51) Int. Cl.
*H04N 19/159* (2014.01)
*H04N 19/172* (2014.01)

(56) References Cited

U.S. PATENT DOCUMENTS

| | | | | |
|---|---|---|---|---|
| 2021/0160520 | A1 | 5/2021 | Chen et al. | |
| 2022/0329824 | A1* | 10/2022 | Liao | H04N 19/119 |
| 2022/0353500 | A1* | 11/2022 | Li | H04N 19/119 |
| 2022/0368930 | A1* | 11/2022 | Filippov | H04N 19/44 |
| 2022/0385888 | A1* | 12/2022 | Lee | H04N 19/105 |
| 2023/0144567 | A1* | 5/2023 | Panusopone | H04N 19/159 375/240.02 |
| 2023/0421773 | A1* | 12/2023 | Chen | H04N 19/132 |
| 2025/0280107 | A1* | 9/2025 | Chiang | H04N 19/119 |

FOREIGN PATENT DOCUMENTS

| | | | |
|---|---|---|---|
| WO | 2021129694 | A1 | 7/2021 |
| WO | 2023040968 | A1 | 3/2023 |

OTHER PUBLICATIONS

"Edge-Directed Geometric Partitioning for Versatile Video Coding"—Meng et al., 978-1-7281-1331-9/20/$31.00 2020 IEEE (Year: 2020).*

International Search Report of PCT Application No. PCT/US2023/025907 dated Oct. 4, 2023, (4p).

Yoshitaka Kidani et al., Non-EE2: Adaptive width for GPM blending area', JVET-Z0059-v2, Joint Video Experts Team (JVET) of ITU-T SG 16 WP 3 and ISO/IEC JTC 1/SC 29, 26th Meeting, by teleconference, pp. 1-5, Apr. 20, 2022, (6p).

Extended European Search Report of EP Application No. 23827814.7 dated May 21, 2026, (12p).

Kidani, Yoshitaka et al., "EE2-related Combination of JVET-X0078 (Test 7/8), JVET-X0147 (Proposal-2), and GPM direct motion storage", Joint Video Experts Team (JVET) of ITU-T SG 16 WP 3 and ISO/IEC JTC 1/SC 29, JVET-X0166-v3, 24th meeting by teleconference Oct. 6-15, 2021, (5p).

Kidani, Yoshitaka, et al., "EE2-3.1: GPM with inter and intra prediction (JVET-X0166)" Joint Video Experts Team (JVET) of ITU-T SG 16 WP 3 and ISO/IEC JTC 1/SC 29, JVET-Y0065, 25th Meeting ty teleconference Jan. 12-21, 2022, (5p).

* cited by examiner

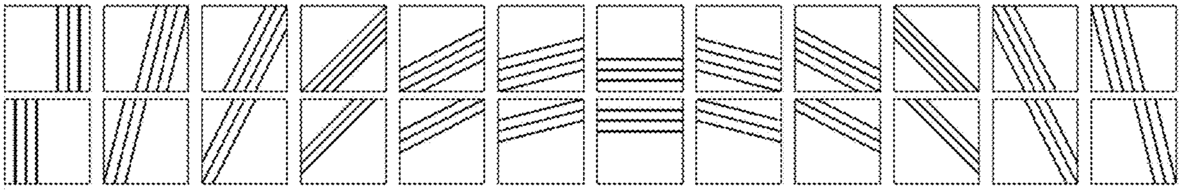
FIG. 4
| | L0 MV | L1 MV |
|---|---|---|
| Merge Index 0 | x | |
| 1 | | x |
| 2 | x | |
| 3 | | x |
| 4 | x | |
FIG. 5
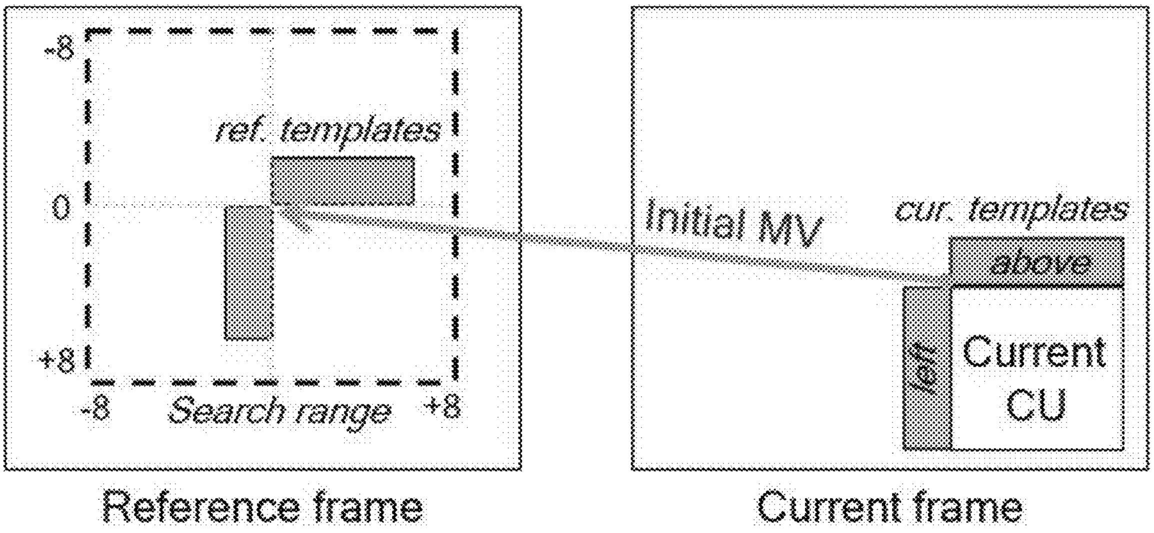
FIG. 6

METHODS AND DEVICES FOR MOTION STORAGE IN GEOMETRIC PARTITIONING MODE

CROSS-REFERENCE TO RELATED APPLICATIONS

The present application is a continuation of PCT Application PCT/US2023/025907 filed on Jun. 21, 2023, which is based on and claims the benefit of U.S. Provisional Application No. 63/354,230, entitled "METHODS AND DEVICES FOR MOTION STORAGE IN GEOMETRIC PARTITIONING MODE" filed on Jun. 21, 2022, both disclosures of which are incorporated by reference in their entireties for all purposes.

TECHNICAL FIELD

The present disclosure relates to video coding and compression. More specifically, this disclosure relates to methods and apparatus on improving the coding efficiency of geometric partitioning (GPM) mode.

BACKGROUND

Various video coding techniques may be used to compress video data. Video coding is performed according to one or more video coding standards. For example, nowadays, some well-known video coding standards include Versatile Video Coding (VVC), High Efficiency Video Coding (HEVC, also known as H.265 or MPEG-H Part2) and Advanced Video Coding (AVC, also known as H.264 or MPEG-4 Part 10), which are jointly developed by ISO/IEC MPEG and ITU-T VECG. AOMedia Video 1 (AV1) was developed by Alliance for Open Media (AOM) as a successor to its preceding standard VP9. Audio Video Coding (AVS), which refers to digital audio and digital video compression standard, is another video compression standard series developed by the Audio and Video Coding Standard Workgroup of China. Most of the existing video coding standards are built upon the famous hybrid video coding framework i.e., using block-based prediction methods (e.g., inter-prediction, intra-prediction) to reduce redundancy present in video images or sequences and using transform coding to compact the energy of the prediction errors. An important goal of video coding techniques is to compress video data into a form that uses a lower bit rate while avoiding or minimizing degradations to video quality.

The first version of the VVC standard was finalized in July 2020, which offers approximately 50% bit-rate saving or equivalent perceptual quality compared to the prior generation video coding standard HEVC. Although the VVC standard provides significant coding improvements than its predecessor, there is evidence that superior coding efficiency may be achieved with additional coding tools. Recently, Joint Video Exploration Team (JVET) under the collaboration of ITU-T VECG and ISO/IEC MPEG started the exploration of advanced technologies that may enable substantial enhancement of coding efficiency over VVC. In April 2021, one software codebase, called Enhanced Compression Model (ECM) was established for future video coding exploration work. The ECM reference software was based on VVC Test Model (VTM) that was developed by JVET for the VVC, with several existing modules (e.g., intra/inter prediction, transform, in-loop filter and so forth) are further extended and/or improved. In future, any new coding tool beyond the VVC standard need to be integrated into the ECM platform, and tested using JVET common test conditions (CTCs).

SUMMARY

The present disclosure provides examples of techniques relating to improving the coding efficiency of geometric partitioning mode (GPM) in a video encoding or decoding process.

According to a first aspect of the present disclosure, there is provided a method for motion field storage. In the method of motion field storage, a decoder may determine at least one motion vector of a first motion vector or a second motion vector, where a coding unit is geometrically partitioned into a first part of a geometric partition and a second part of the geometric partition for prediction in a geometric partitioning mode, and the first motion vector is from the first part and the second motion vector is from the second part. Additionally, the decoder may determine a value of a stored motion vector type based on a motion index and a part index. Furthermore, the decoder may store a motion vector in a corresponding motion field based on the value of the stored motion vector type, where the motion vector includes the first motion vector, the second motion vector, or a combined motion vector obtained based on the first motion vector and the second motion vector.

According to a second aspect of the present disclosure, there is provided a method for motion field storage. In the method for motion field storage, an encoder may determine at least one motion vector of a first motion vector or a second motion vector, where a coding unit is geometrically partitioned into a first part of a geometric partition and a second part of the geometric partition for prediction in a geometric partitioning mode, and the first motion vector is from the first part and the second motion vector is from the second part. Additionally, the encoder may determine a value of a stored motion vector type based on a motion index and a part index. Furthermore, the encoder may store a motion vector in a corresponding motion field based on the value of the stored motion vector type, where the motion vector may include the first motion vector, the second motion vector, or a combined motion vector obtained based on the first motion vector and the second motion vector.

According to a third aspect of the present disclosure, there is provided an apparatus for including one or more processors and a memory coupled to the one or more processors and configured to store instructions executable by the one or more processors. Furthermore, the one or more processors, upon execution of the instructions, are configured to perform the method according to the first aspect above.

According to a fourth aspect of the present disclosure, there is provided an apparatus including one or more processors and a memory coupled to the one or more processors and configured to store instructions executable by the one or more processors. Furthermore, the one or more processors, upon execution of the instructions, are configured to perform the method according to the second aspect above.

According to a fifth aspect of the present disclosure, there is provided a non-transitory computer-readable storage medium storing computer-executable instructions that, when executed by one or more computer processors, cause the one or more computer processors to receive a bitstream, and perform the method according to the first aspect.

According to a sixth aspect of the present disclosure, there is provided a non-transitory computer-readable storage medium storing computer-executable instructions that, when executed by one or more computer processors, cause the one or more computer processors to perform the method according to the second aspect to generate a bitstream.

According to a seventh aspect of the present disclosure, there is provided a non-transitory computer-readable storage medium storing a bitstream to be decoded by the method according to the first aspect.

According to an eighth aspect of the present disclosure, there is provided a non-transitory computer-readable storage medium storing a bitstream generated by the method according to the second aspect.

BRIEF DESCRIPTION OF THE DRAWINGS

A more particular description of the examples of the present disclosure will be rendered by reference to specific examples illustrated in the appended drawings. Given that these drawings depict only some examples and are not therefore considered to be limiting in scope, the examples will be described and explained with additional specificity and details through the use of the accompanying drawings.

FIG. 4 illustrates allowed GPM partitions in accordance with some examples of the present disclosure.

FIG. 5 illustrates selection of uni-prediction motion vector from motion vectors of merge candidate list for the GPM in accordance with some examples of the present disclosure.

FIG. 6 illustrates template matching algorithm in accordance with some examples of the present disclosure.

DETAILED DESCRIPTION

Figure 1A:
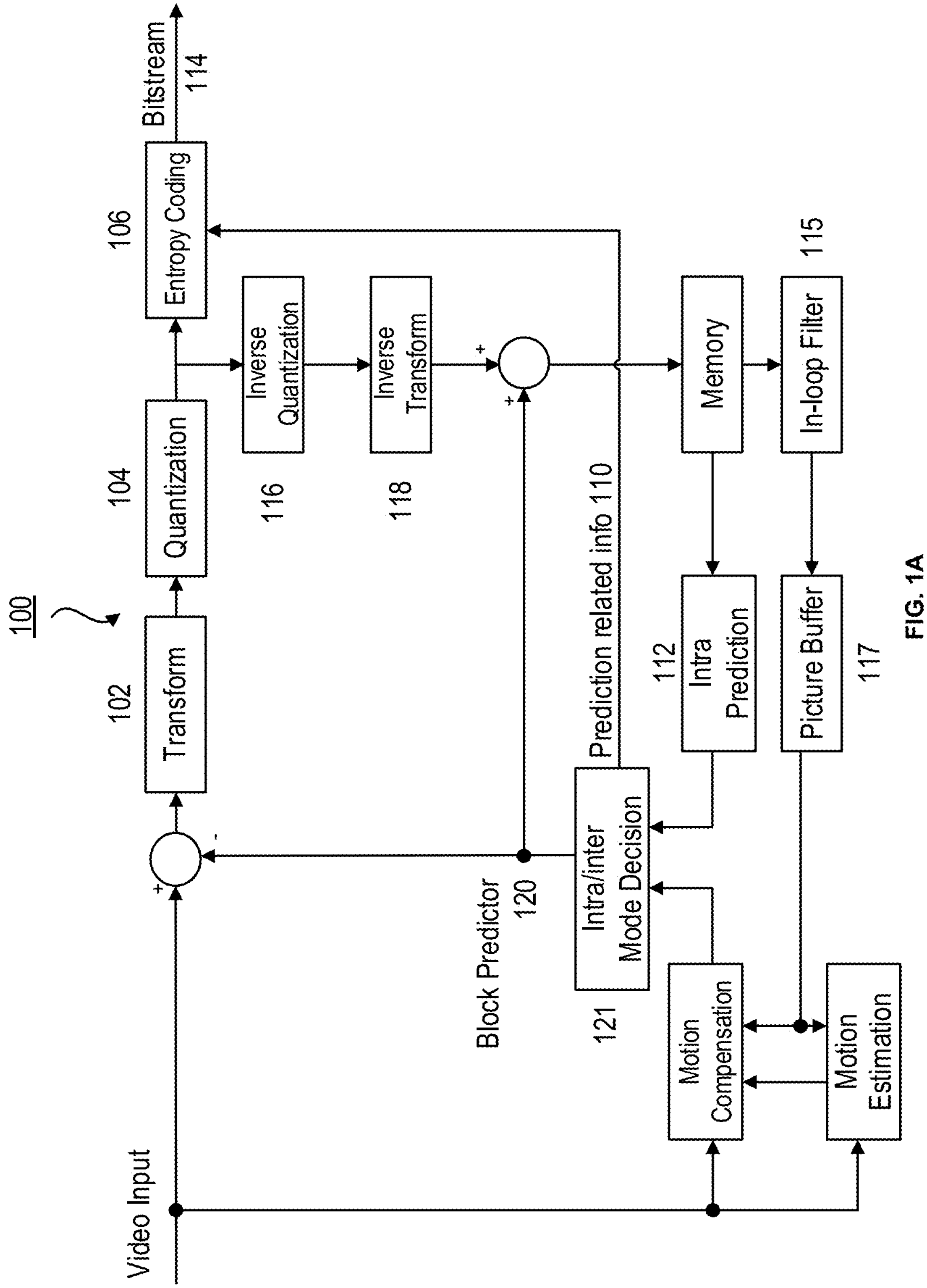
FIG. 1A is a block diagram of a video encoder in accordance with some examples of the present disclosure.

Reference will now be made in detail to specific implementations, examples of which are illustrated in the accompanying drawings. In the following detailed description, numerous non-limiting specific details are set forth in order to assist in understanding the subject matter presented herein. But it will be apparent to one of ordinary skill in the art that various alternatives may be used. For example, it will be apparent to one of ordinary skill in the art that the subject matter presented herein can be implemented on many types of electronic devices with digital video capabilities.

Terms used in the disclosure are only adopted for the purpose of describing specific embodiments and not intended to limit the disclosure. "A/an," "said," and "the" in a singular form in the disclosure and the appended claims are also intended to include a plural form, unless other meanings are clearly denoted throughout the disclosure. It is also to be understood that term "and/or" used in the disclosure refers to and includes one or any or all possible combinations of multiple associated items that are listed.

Reference throughout this specification to "one embodiment," "an embodiment," "an example," "some embodiments," "some examples," or similar language means that a particular feature, structure, or characteristic described is included in at least one embodiment or example. Features, structures, elements, or characteristics described in connection with one or some embodiments are also applicable to other embodiments, unless expressly specified otherwise.

Throughout the disclosure, the terms "first," "second," "third," etc. are all used as nomenclature only for references to relevant elements, e.g., devices, components, compositions, steps, etc., without implying any spatial or chronological orders, unless expressly specified otherwise. For example, a "first device" and a "second device" may refer to two separately formed devices, or two parts, components, or operational states of a same device, and may be named arbitrarily.

The terms "module," "sub-module," "circuit," "sub-circuit," "circuitry," "sub-circuitry," "unit," or "sub-unit" may include memory (shared, dedicated, or group) that stores code or instructions that can be executed by one or more processors. A module may include one or more circuits with or without stored code or instructions. The module or circuit may include one or more components that are directly or indirectly connected. These components may or may not be physically attached to, or located adjacent to, one another.

As used herein, the term "if" or "when" may be understood to mean "upon" or "in response to" depending on the context. These terms, if appear in a claim, may not indicate that the relevant limitations or features are conditional or optional. For example, a method may comprise steps of: i) when or if condition X is present, function or action X' is performed, and ii) when or if condition Y is present, function or action Y' is performed. The method may be implemented with both the capability of performing function or action X', and the capability of performing function or action Y'. Thus, the functions X' and Y' may both be performed, at different times, on multiple executions of the method.

A unit or module may be implemented purely by software, purely by hardware, or by a combination of hardware and software. In a pure software implementation, for example, the unit or module may include functionally related code blocks or software components, that are directly or indirectly linked together, so as to perform a particular function.

Similar to all the preceding video coding standards, the ECM is built upon the block-based hybrid video coding framework. FIG. 1A gives the block diagram of a generic block-based hybrid video encoding system. The input video signal is processed block by block (called coding units (CUs)). In ECM-1.0, a CU can be up to 128×128 pixels. However, same to the VVC, one coding tree unit (CTU) is split into CUs to adapt to varying local characteristics based on quad/binary/ternary-tree.

In the multi-type tree structure, one CTU is firstly partitioned by a quad-tree structure. Then, each quad-tree leaf node can be further partitioned by a binary and ternary tree structure.

Figure 2:
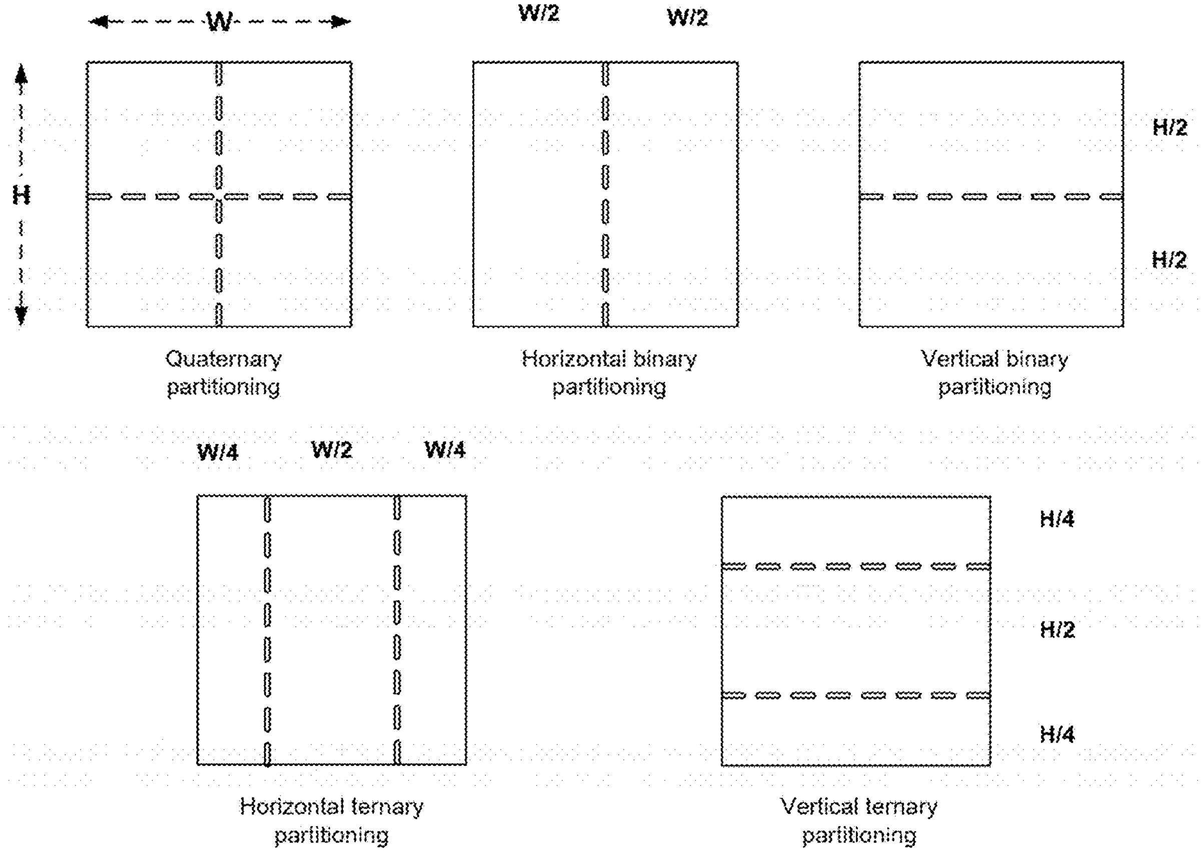
FIG. 2 is a diagram illustrating block partitions in a multi-type tree structure in accordance with some examples of the present disclosure.

FIG. 2 is a schematic diagram illustrating multi-type tree splitting modes in accordance with some implementations of the present disclosure. As shown in FIG. 2, there are five splitting types, quaternary partitioning, horizontal binary partitioning, vertical binary partitioning, horizontal ternary partitioning, and vertical ternary partitioning.

In FIG. 2, spatial prediction and/or temporal prediction may be performed. Spatial prediction (or "intra prediction") uses pixels from the samples of already coded neighboring blocks (which are called reference samples) in the same video picture/slice to predict the current video block. Spatial prediction reduces spatial redundancy inherent in the video signal. Temporal prediction (also referred to as "inter prediction" or "motion compensated prediction") uses reconstructed pixels from the already coded video pictures to predict the current video block. Temporal prediction reduces temporal redundancy inherent in the video signal. Temporal prediction signal for a given CU is usually signaled by one or more motion vectors (MVs) which indicate the amount and the direction of motion between the current CU and its temporal reference.

Also, if multiple reference pictures are supported, one reference picture index is additionally sent, which is used to identify from which reference picture in the reference picture store the temporal prediction signal comes. After spatial and/or temporal prediction, the mode decision block in the encoder chooses the best prediction mode, for example based on the rate-distortion optimization method. The prediction block is then subtracted from the current video block; and the prediction residual is de-correlated using transform and quantized. The quantized residual coefficients are inverse quantized and inverse transformed to form the reconstructed residual, which is then added back to the prediction block to form the reconstructed signal of the CU. Further in-loop filtering, such as deblocking filter, sample adaptive offset (SAO) and adaptive in-loop filter (ALF) may be applied on the reconstructed CU before it is put in the reference picture store and used to code future video blocks. To form the output video bit-stream, coding mode (inter or intra), prediction mode information, motion information, and quantized residual coefficients are all sent to the entropy coding unit to be further compressed and packed to form the bit-stream.

Figure 3:
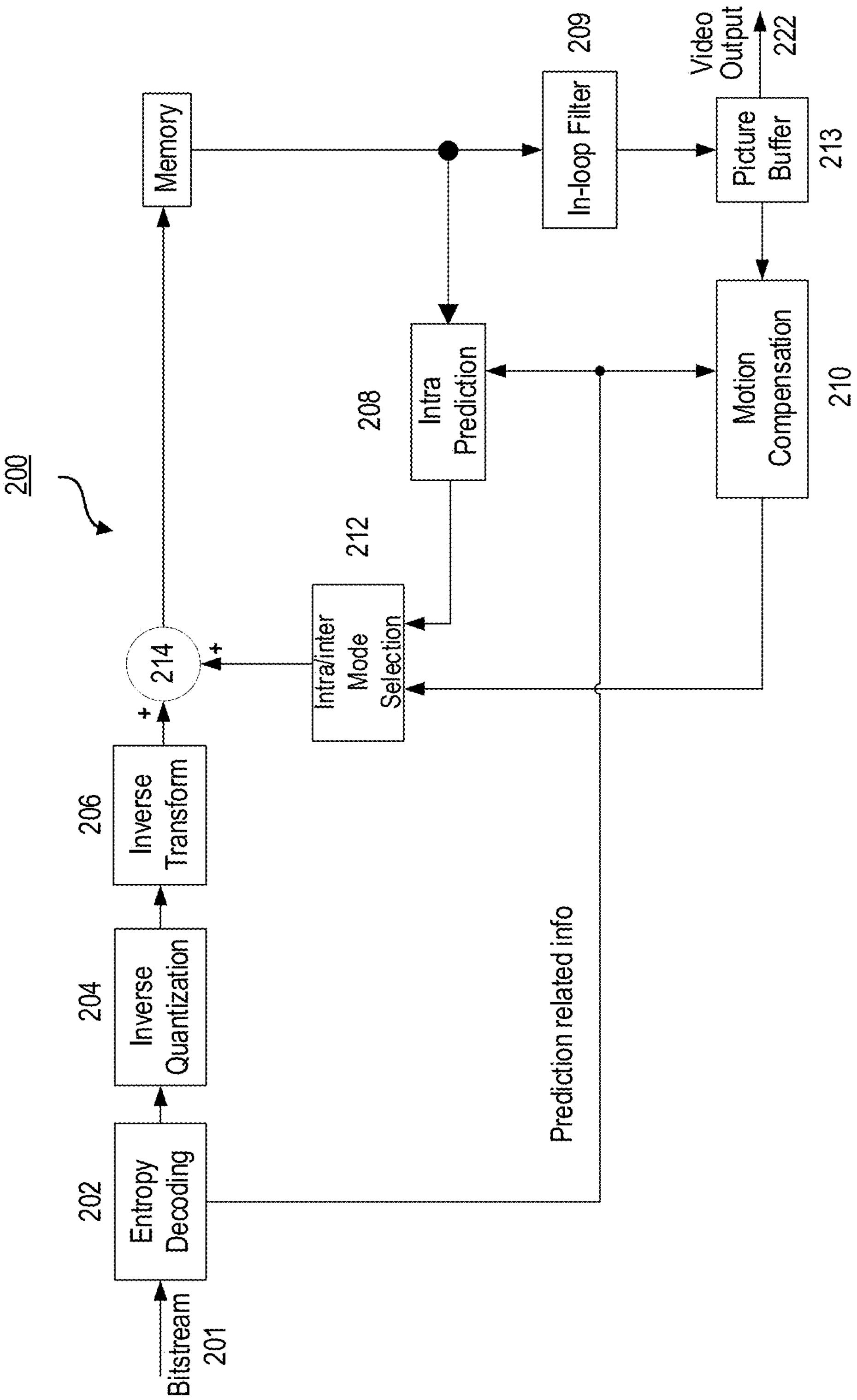
FIG. 3 is a block diagram of a video decoder in accordance with some examples of the present disclosure.

FIG. 3 provides a block diagram of a block-based video decoder in accordance with some examples of the present disclosure. In the block-based video decoder 200, the video bit-stream 201 is first entropy decoded at entropy decoding unit 202. The coding mode and prediction information are sent to either the spatial prediction unit (if intra coded) or the temporal prediction unit (if inter coded) to form the prediction block. The residual transform coefficients are sent to inverse quantization unit 204 and inverse transform unit 206 to reconstruct the residual block. The prediction block and the residual block are then added together. The reconstructed block may further go through in-loop filtering 209 before it is stored in reference picture buffer 213. The reconstructed video in reference picture buffer 213 is then sent out for display, as well as used to predict future video blocks.

The main focus of this disclosure is to further improve the coding efficiency of GPM in the ECM. In the following, some related coding tools in the ECM are briefly reviewed. After that, some deficiencies in the existing design of the current GPM discussed. Finally, the solutions are provided to improve the existing GPM in the ECM.

Figure 17:
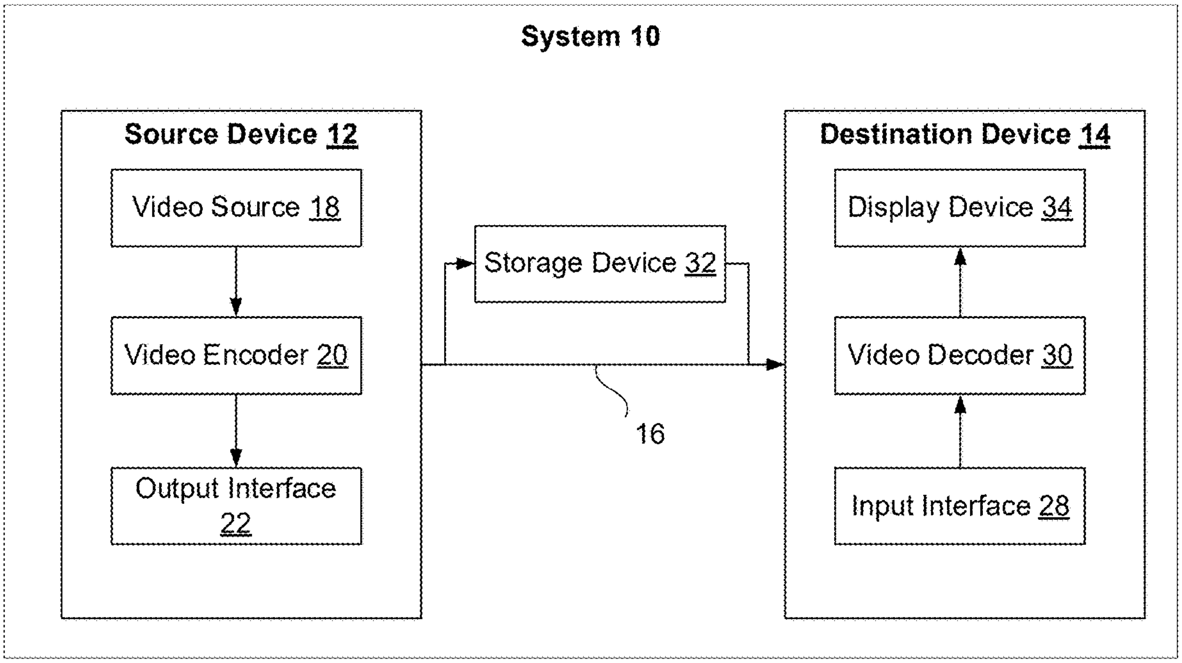
FIG. 17 is a block diagram illustrating a system for encoding and decoding video blocks in accordance with some examples of the present disclosure.

FIG. 17 is a block diagram illustrating an exemplary system 10 for encoding and decoding video blocks in parallel in accordance with some implementations of the present disclosure. As shown in FIG. 17, the system 10 includes a source device 12 that generates and encodes video data to be decoded at a later time by a destination device 14. The source device 12 and the destination device 14 may comprise any of a wide variety of electronic devices, including desktop or laptop computers, tablet computers, smart phones, set-top boxes, digital televisions, cameras, display devices, digital media players, video gaming consoles, video streaming device, or the like. In some implementations, the source device 12 and the destination device 14 are equipped with wireless communication capabilities.

In some implementations, the destination device 14 may receive the encoded video data to be decoded via a link 16. The link 16 may comprise any type of communication medium or device capable of moving the encoded video data from the source device 12 to the destination device 14. In one example, the link 16 may comprise a communication medium to enable the source device 12 to transmit the encoded video data directly to the destination device 14 in real time. The encoded video data may be modulated according to a communication standard, such as a wireless communication protocol, and transmitted to the destination device 14. The communication medium may comprise any wireless or wired communication medium, such as a Radio Frequency (RF) spectrum or one or more physical transmission lines. The communication medium may form part of a packet-based network, such as a local area network, a wide-area network, or a global network such as the Internet. The communication medium may include routers, switches, base stations, or any other equipment that may be useful to facilitate communication from the source device 12 to the destination device 14.

In some other implementations, the encoded video data may be transmitted from an output interface 22 to a storage device 32. Subsequently, the encoded video data in the storage device 32 may be accessed by the destination device 14 via an input interface 28. The storage device 32 may include any of a variety of distributed or locally accessed data storage media such as a hard drive, Blu-ray discs, Digital Versatile Disks (DVDs), Compact Disc Read-Only Memories (CD-ROMs), flash memory, volatile or non-volatile memory, or any other suitable digital storage media for storing the encoded video data. In a further example, the storage device 32 may correspond to a file server or another intermediate storage device that may hold the encoded video data generated by the source device 12. The destination device 14 may access the stored video data from the storage device 32 via streaming or downloading. The file server may be any type of computer capable of storing the encoded video data and transmitting the encoded video data to the destination device 14. Exemplary file servers include a web server (e.g., for a website), a File Transfer Protocol (FTP) server, Network Attached Storage (NAS) devices, or a local disk drive. The destination device 14 may access the encoded video data through any standard data connection, including a wireless channel (e.g., a Wireless Fidelity (Wi-Fi) connection), a wired connection (e.g., Digital Subscriber Line (DSL), cable modem, etc.), or a combination of both that is suitable for accessing encoded video data stored on a file server. The transmission of the encoded video data from the storage device 32 may be a streaming transmission, a download transmission, or a combination of both.

As shown in FIG. 17, the source device 12 includes a video source 18, a video encoder 20 and the output interface 22. The video source 18 may include a source such as a video capturing device, e.g., a video camera, a video archive containing previously captured video, a video feeding interface to receive video from a video content provider, and/or a computer graphics system for generating computer graphics data as the source video, or a combination of such sources. As one example, if the video source 18 is a video camera of a security surveillance system, the source device 12 and the destination device 14 may form camera phones or video phones. However, the implementations described in the present application may be applicable to video coding in general, and may be applied to wireless and/or wired applications.

The captured, pre-captured, or computer-generated video may be encoded by the video encoder 20. The encoded video data may be transmitted directly to the destination device 14 via the output interface 22 of the source device 12. The encoded video data may also (or alternatively) be stored onto the storage device 32 for later access by the destination device 14 or other devices, for decoding and/or playback. The output interface 22 may further include a modem and/or a transmitter. In some examples, the video encoder 20 may be the video encoding system as shown in FIG. 1.

The destination device 14 includes the input interface 28, a video decoder 30, and a display device 34. The input interface 28 may include a receiver and/or a modem and receive the encoded video data over the link 16. The encoded video data communicated over the link 16, or provided on the storage device 32, may include a variety of syntax elements generated by the video encoder 20 for use by the video decoder 30 in decoding the video data. Such syntax elements may be included within the encoded video data transmitted on a communication medium, stored on a storage medium, or stored on a file server. In some examples, the video decoder 30 may be the video decoder as shown in FIG. 3.

In some implementations, the destination device 14 may include the display device 34, which can be an integrated display device and an external display device that is configured to communicate with the destination device 14. The display device 34 displays the decoded video data to a user, and may comprise any of a variety of display devices such as a Liquid Crystal Display (LCD), a plasma display, an Organic Light Emitting Diode (OLED) display, or another type of display device.

The video encoder 20 and the video decoder 30 may operate according to proprietary or industry standards, such as VVC, HEVC, MPEG-4, Part 10, AVC, or extensions of such standards. It should be understood that the present application is not limited to a specific video encoding/decoding standard and may be applicable to other video encoding/decoding standards. It is generally contemplated that the video encoder 20 of the source device 12 may be configured to encode video data according to any of these current or future standards. Similarly, it is also generally contemplated that the video decoder 30 of the destination device 14 may be configured to decode video data according to any of these current or future standards.

The video encoder 20 and the video decoder 30 each may be implemented as any of a variety of suitable encoder and/or decoder circuitry, such as one or more microprocessors, Digital Signal Processors (DSPs), Application Specific Integrated Circuits (ASICs), Field Programmable Gate Arrays (FPGAs), discrete logic, software, hardware, firmware or any combinations thereof. When implemented partially in software, an electronic device may store instructions for the software in a suitable, non-transitory computer-readable medium and execute the instructions in hardware using one or more processors to perform the video encoding/decoding operations disclosed in the present disclosure. Each of the video encoder 20 and the video decoder 30 may be included in one or more encoders or decoders, either of which may be integrated as part of a combined encoder/decoder (CODEC) in a respective device.

In a typical video coding process, a video sequence typically includes an ordered set of frames or pictures. Each frame may include three sample arrays, denoted SL, SCb, and SCr. SL is a two-dimensional array of luma samples. SCb is a two-dimensional array of Cb chroma samples. SCr is a two-dimensional array of Cr chroma samples. In other instances, a frame may be monochrome and therefore includes only one two-dimensional array of luma samples.

Figure 1B:
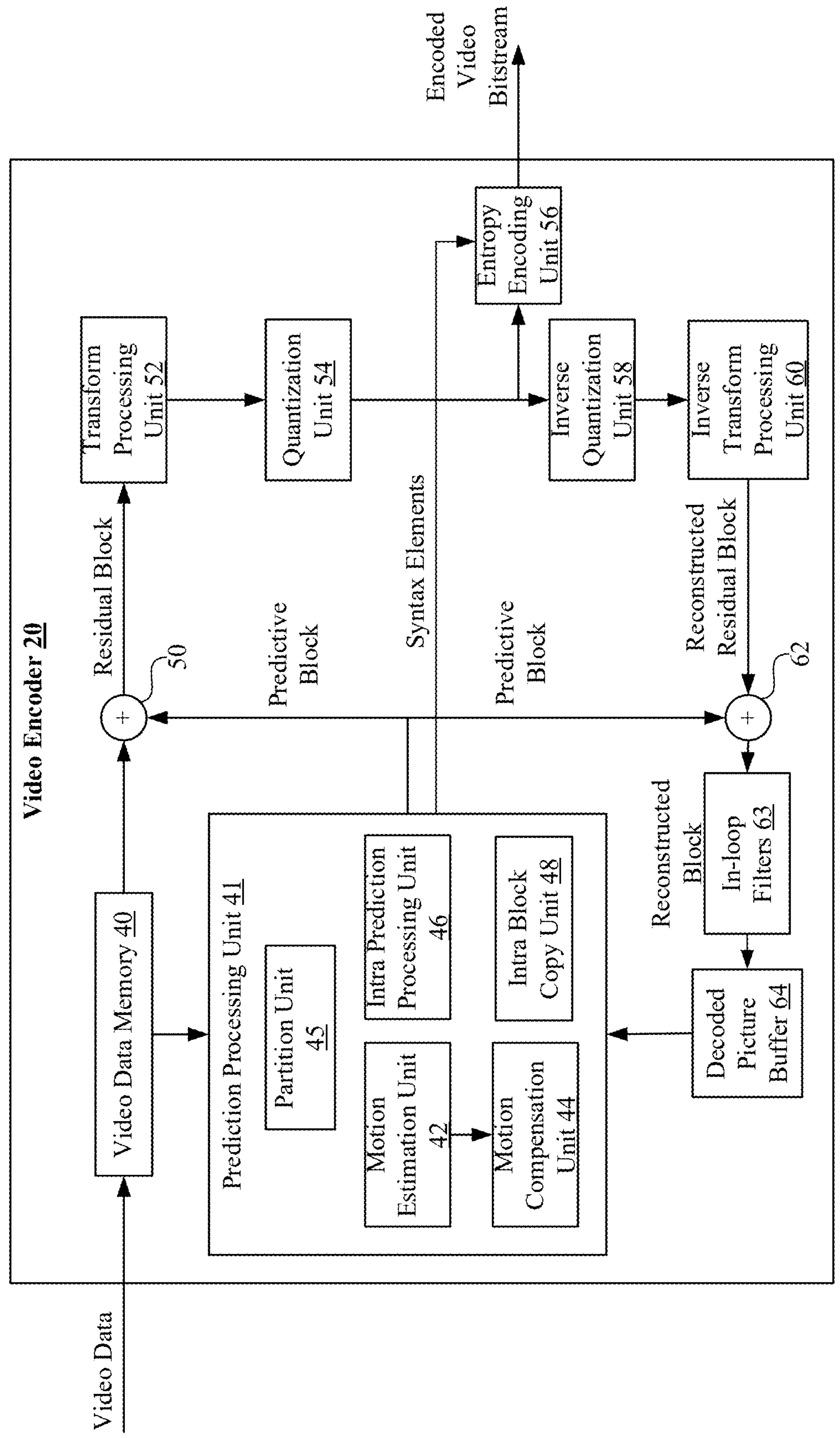
FIG. 1B is a block diagram illustrating an exemplary video encoder in accordance with some examples of the present disclosure.
Figure 1C:
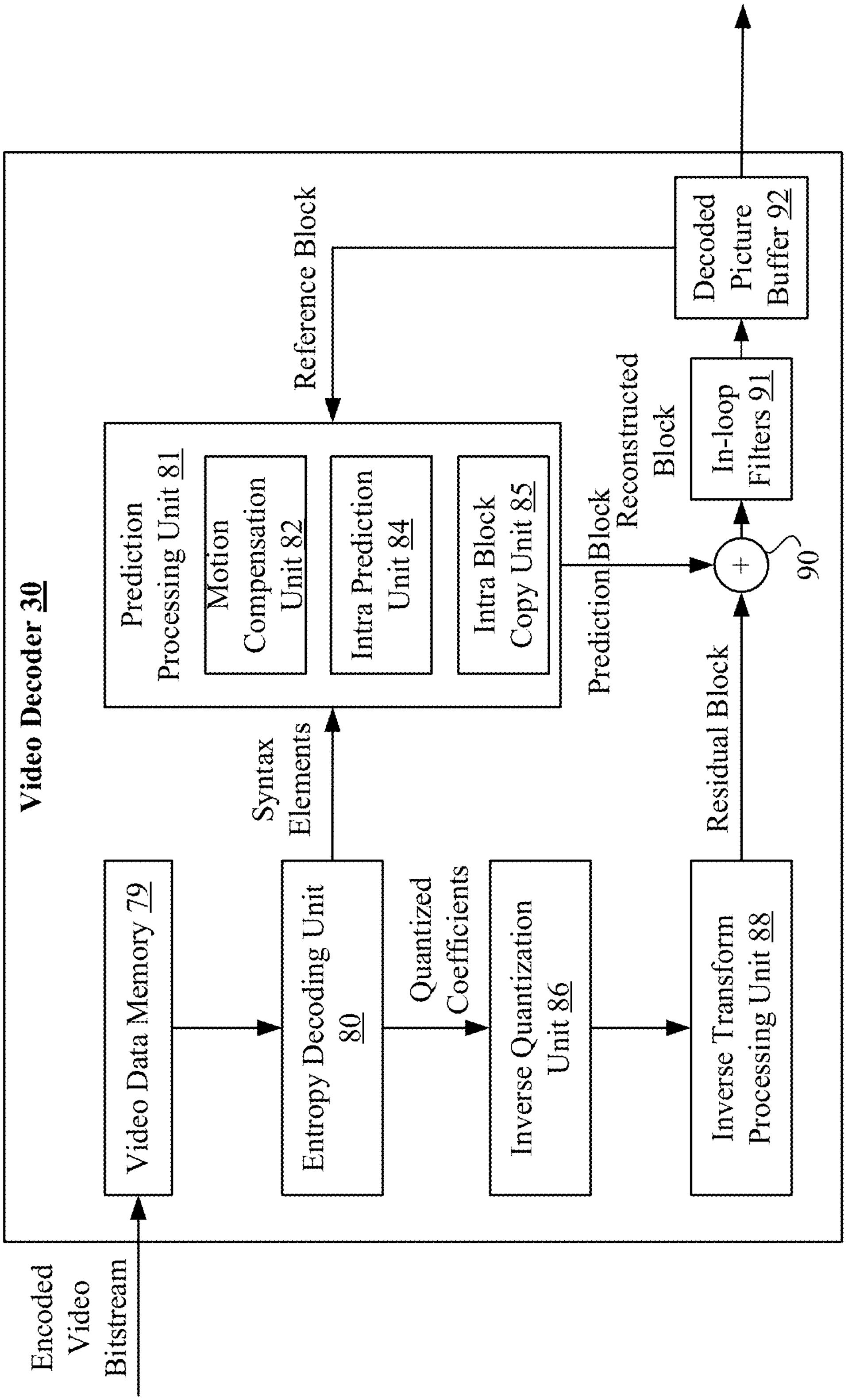
FIG. 1C is a block diagram illustrating an exemplary video decoder in accordance with some examples of the present disclosure.
Figure 19A:
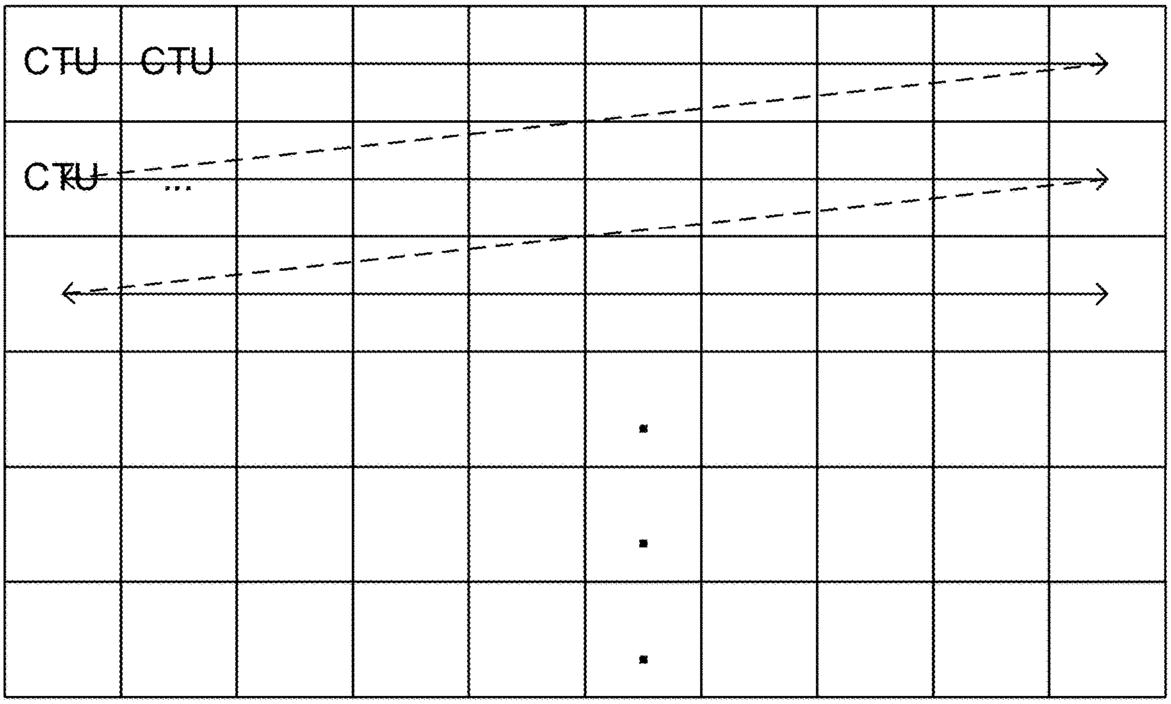
FIG. 19A is a diagram illustrating block partitions in a multi-type tree structure in accordance with some examples of the present disclosure.
Figure 19B:
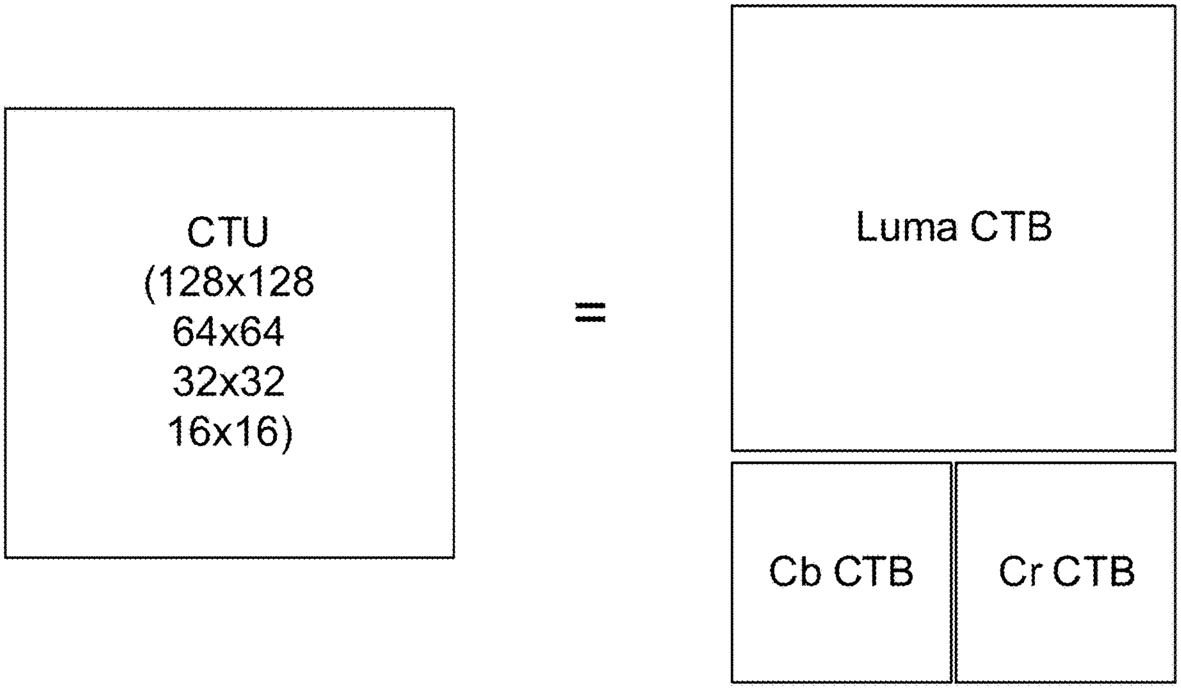
FIG. 19B is a diagram illustrating block partitions in a multi-type tree structure in accordance with some examples of the present disclosure.

As shown in FIG. 19A, the video encoder 20 (or more specifically the partition unit 45) (as shown in FIG. 1B) generates an encoded representation of a frame by first partitioning the frame into a set of CTUs. A video frame may include an integer number of CTUs ordered consecutively in a raster scan order from left to right and from top to bottom. Each CTU is a largest logical coding unit and the width and height of the CTU are signaled by the video encoder 20 (as shown in FIG. 1B) in a sequence parameter set, such that all the CTUs in a video sequence have the same size being one of 128×128, 64×64, 32×32, and 16×16. But it should be noted that the present application is not necessarily limited to a particular size. As shown in FIG. 19B, each CTU may comprise one CTB of luma samples, two corresponding coding tree blocks of chroma samples, and syntax elements used to code the samples of the coding tree blocks. The syntax elements describe properties of different types of units of a coded block of pixels and how the video sequence can be reconstructed at the video decoder 30 (as shown in FIG. 1C), including inter or intra prediction, intra prediction mode, motion vectors, and other parameters. In monochrome pictures or pictures having three separate color planes, a CTU may comprise a single coding tree block and syntax elements used to code the samples of the coding tree block. A coding tree block may be an N×N block of samples.

Figure 19C:
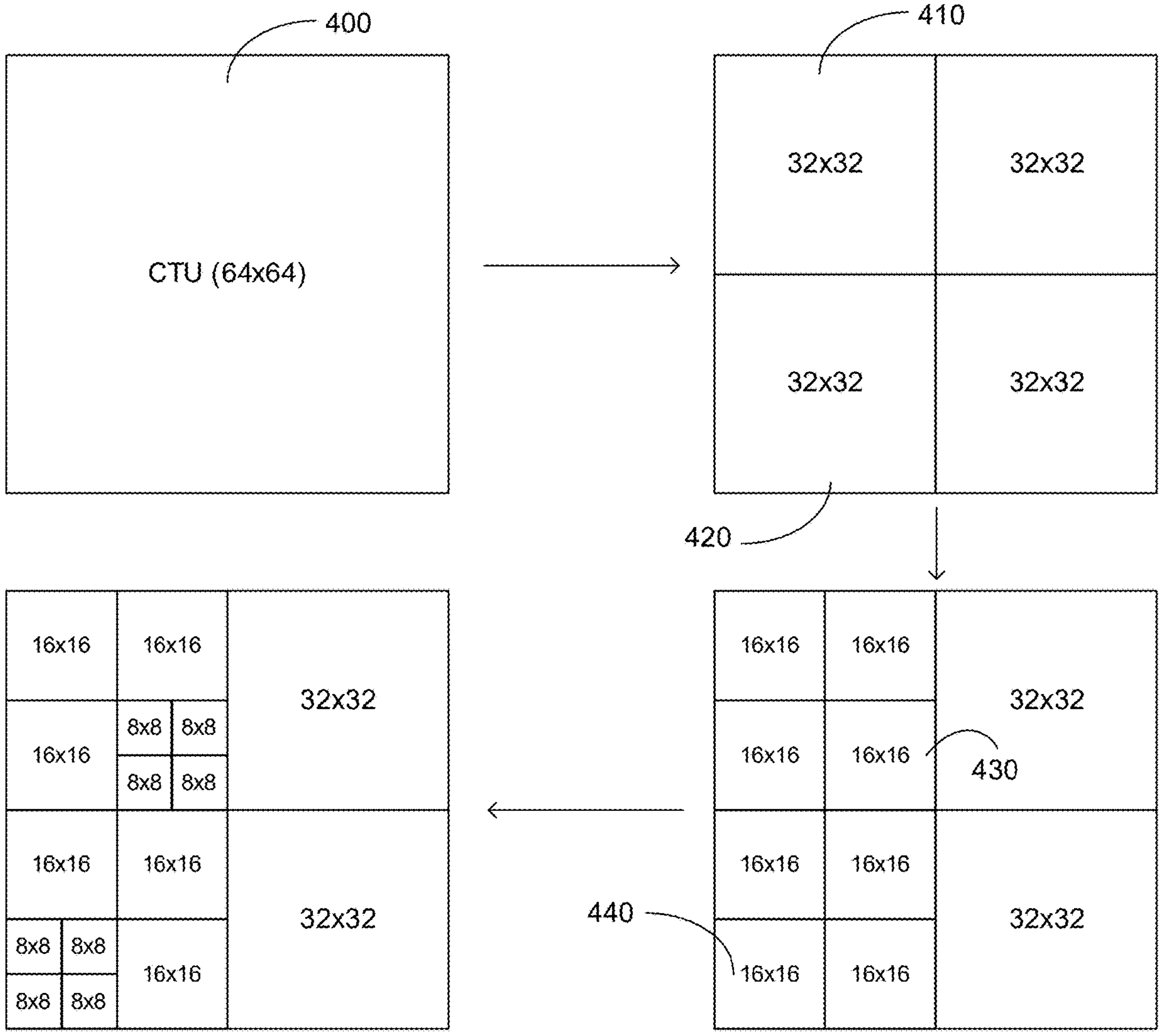
FIG. 19C is a diagram illustrating block partitions in a multi-type tree structure in accordance with some examples of the present disclosure.
Figure 19D:
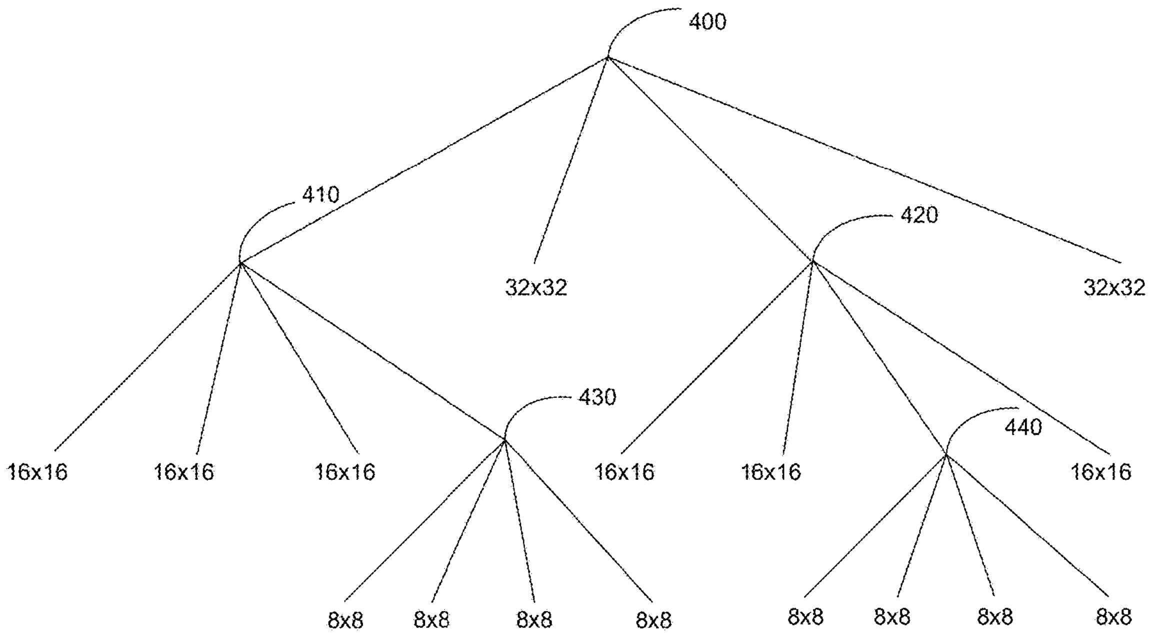
FIG. 19D is a diagram illustrating block partitions in a multi-type tree structure in accordance with some examples of the present disclosure.

To achieve a better performance, the video encoder 20 (as shown in FIG. 1B) may recursively perform tree partitioning such as binary-tree partitioning, ternary-tree partitioning, quad-tree partitioning or a combination thereof on the coding tree blocks of the CTU and divide the CTU into smaller CUs. As depicted in FIG. 19C, the 64×64 CTU 400 is first divided into four smaller CUs, each having a block size of 32×32. Among the four smaller CUs, CU 410 and CU 420 are each divided into four CUs of 16×16 by block size. The two 16×16 CUs 430 and 440 are each further divided into four CUs of 8×8 by block size. FIG. 19D depicts a quad-tree data structure illustrating the end result of the partition process of the CTU 400 as depicted in FIG. 19C, each leaf node of the quad-tree corresponding to one CU of a respective size ranging from 32×32 to 8×8. Like the CTU depicted in FIG. 19B, each CU may comprise a CB of luma samples and two corresponding coding blocks of chroma samples of a frame of the same size, and syntax elements used to code the samples of the coding blocks. In monochrome pictures or pictures having three separate color planes, a CU may comprise a single coding block and syntax structures used to code the samples of the coding block. It should be noted that the quad-tree partitioning depicted in FIG. 19C and FIG. 19D is only for illustrative purposes and one CTU can be split into CUs to adapt to varying local characteristics based on quad/ternary/binary-tree partitions. In the multi-type tree structure, one CTU is partitioned by a quad-tree structure and each quad-tree leaf CU can be further partitioned by a binary and ternary tree structure. As shown in FIG. 2, there are five possible partitioning types of a coding block having a width W and a height H, i.e., quaternary partitioning, horizontal binary partitioning, vertical binary partitioning, horizontal ternary partitioning, and vertical ternary partitioning.

In some implementations, the video encoder 20 may further partition a coding block of a CU into one or more M×N PBs. A PB is a rectangular (square or non-square) block of samples on which the same prediction, inter or intra, is applied. A PU of a CU may comprise a PB of luma samples, two corresponding PBs of chroma samples, and syntax elements used to predict the PBs. In monochrome pictures or pictures having three separate color planes, a PU may comprise a single PB and syntax structures used to predict the PB. The video encoder 20 may generate predictive luma, Cb, and Cr blocks for luma, Cb, and Cr PBs of each PU of the CU.

The video encoder 20 may use intra prediction or inter prediction to generate the predictive blocks for a PU. If the video encoder 20 uses intra prediction to generate the predictive blocks of a PU, the video encoder 20 may generate the predictive blocks of the PU based on decoded samples of the frame associated with the PU. If the video encoder 20 uses inter prediction to generate the predictive blocks of a PU, the video encoder 20 may generate the predictive blocks of the PU based on decoded samples of one or more frames other than the frame associated with the PU.

After the video encoder 20 generates predictive luma, Cb, and Cr blocks for one or more PUs of a CU, the video encoder 20 may generate a luma residual block for the CU by subtracting the CU's predictive luma blocks from its original luma coding block such that each sample in the CU's luma residual block indicates a difference between a luma sample in one of the CU's predictive luma blocks and a corresponding sample in the CU's original luma coding block. Similarly, the video encoder 20 may generate a Cb residual block and a Cr residual block for the CU, respectively, such that each sample in the CU's Cb residual block indicates a difference between a Cb sample in one of the CU's predictive Cb blocks and a corresponding sample in the CU's original Cb coding block and each sample in the CU's Cr residual block may indicate a difference between a Cr sample in one of the CU's predictive Cr blocks and a corresponding sample in the CU's original Cr coding block.

Furthermore, as illustrated in FIG. 19C, the video encoder 20 may use quad-tree partitioning to decompose the luma, Cb, and Cr residual blocks of a CU into one or more luma, Cb, and Cr transform blocks respectively. A transform block is a rectangular (square or non-square) block of samples on which the same transform is applied. A TU of a CU may comprise a transform block of luma samples, two corresponding transform blocks of chroma samples, and syntax elements used to transform the transform block samples. Thus, each TU of a CU may be associated with a luma transform block, a Cb transform block, and a Cr transform block. In some examples, the luma transform block associated with the TU may be a sub-block of the CU's luma residual block. The Cb transform block may be a sub-block of the CU's Cb residual block. The Cr transform block may be a sub-block of the CU's Cr residual block. In monochrome pictures or pictures having three separate color planes, a TU may comprise a single transform block and syntax structures used to transform the samples of the transform block.

The video encoder 20 may apply one or more transforms to a luma transform block of a TU to generate a luma coefficient block for the TU. A coefficient block may be a two-dimensional array of transform coefficients. A transform coefficient may be a scalar quantity. The video encoder 20 may apply one or more transforms to a Cb transform block of a TU to generate a Cb coefficient block for the TU. The video encoder 20 may apply one or more transforms to a Cr transform block of a TU to generate a Cr coefficient block for the TU.

After generating a coefficient block (e.g., a luma coefficient block, a Cb coefficient block or a Cr coefficient block), the video encoder 20 may quantize the coefficient block. Quantization generally refers to a process in which transform coefficients are quantized to possibly reduce the amount of data used to represent the transform coefficients, providing further compression. After the video encoder 20 quantizes a coefficient block, the video encoder 20 may entropy encode syntax elements indicating the quantized transform coefficients. For example, the video encoder 20 may perform CABAC on the syntax elements indicating the quantized transform coefficients. Finally, the video encoder 20 may output a bitstream that includes a sequence of bits that forms a representation of coded frames and associated data, which is either saved in the storage device 32 or transmitted to the destination device 14.

After receiving a bitstream generated by the video encoder 20, the video decoder 30 may parse the bitstream to obtain syntax elements from the bitstream. The video decoder 30 may reconstruct the frames of the video data based at least in part on the syntax elements obtained from the bitstream. The process of reconstructing the video data is generally reciprocal to the encoding process performed by the video encoder 20. For example, the video decoder 30 may perform inverse transforms on the coefficient blocks associated with TUs of a current CU to reconstruct residual blocks associated with the TUs of the current CU. The video decoder 30 also reconstructs the coding blocks of the current CU by adding the samples of the predictive blocks for PUs of the current CU to corresponding samples of the transform blocks of the TUs of the current CU. After reconstructing the coding blocks for each CU of a frame, video decoder 30 may reconstruct the frame.

As noted above, video coding achieves video compression using primarily two modes, i.e., intra-frame prediction (or intra-prediction) and inter-frame prediction (or inter-prediction). It is noted that IBC could be regarded as either intra-frame prediction or a third mode. Between the two modes, inter-frame prediction contributes more to the coding efficiency than intra-frame prediction because of the use of motion vectors for predicting a current video block from a reference video block.

But with the ever improving video data capturing technology and more refined video block size for preserving details in the video data, the amount of data required for representing motion vectors for a current frame also increases substantially. One way of overcoming this challenge is to benefit from the fact that not only a group of neighboring CUs in both the spatial and temporal domains have similar video data for predicting purpose but the motion vectors between these neighboring CUs are also similar. Therefore, it is possible to use the motion information of spatially neighboring CUs and/or temporally co-located CUs as an approximation of the motion information (e.g., motion vector) of a current CU by exploring their spatial and temporal correlation, which is also referred to as "Motion Vector Predictor (MVP)" of the current CU.

Instead of encoding, into the video bitstream, an actual motion vector of the current CU determined by the motion estimation unit 42 as described above in connection with FIG. 1B, the motion vector predictor of the current CU is subtracted from the actual motion vector of the current CU to produce a Motion Vector Difference (MVD) for the current CU. By doing so, there is no need to encode the motion vector determined by the motion estimation unit 42 for each CU of a frame into the video bitstream and the amount of data used for representing motion information in the video bitstream can be significantly decreased.

Like the process of choosing a predictive block in a reference frame during inter-frame prediction of a code block, a set of rules need to be adopted by both the video encoder 20 and the video decoder 30 for constructing a motion vector candidate list (also known as a "merge list") for a current CU using those potential candidate motion vectors associated with spatially neighboring CUs and/or temporally co-located CUs of the current CU and then selecting one member from the motion vector candidate list as a motion vector predictor for the current CU. By doing so, there is no need to transmit the motion vector candidate list itself from the video encoder 20 to the video decoder 30 and an index of the selected motion vector predictor within the motion vector candidate list is sufficient for the video encoder 20 and the video decoder 30 to use the same motion vector predictor within the motion vector candidate list for encoding and decoding the current CU.

Geometric Partitioning Mode (GPM)

In the VVC, a geometric partitioning mode is supported for inter prediction. The geometric partitioning mode is signaled by one CU-level flag as one special merge mode. In the current GPM design, 64 partitions are supported in total by the GPM mode for each possible CU size with both width and height not smaller than 8 and not larger than 64, excluding 8×64 and 64×8.

When this mode is used, a CU is split into two parts by a geometrically located straight line as shown in FIG. 4. The location of the splitting line is mathematically derived from an angle and an offset parameter of a specific partition. Each part of a geometric partition in the CU is inter-predicted using its own motion; only uni-prediction is allowed for each partition, that is, each part has one motion vector and one reference index. The uni-prediction motion constraint is applied to ensure that same as the conventional bi-prediction, only two motion compensated prediction are needed for each CU. If geometric partitioning mode is used for the current CU, then a geometric partition index indicating the partition mode of the geometric partition (angle and offset), and two merge indices (one for each partition) are further signaled. The number of maximum GPM candidate size is signaled explicitly at sequence level.

Uni-Prediction Candidate List Construction

To derive the uni-prediction motion vector for one geometric partition, one uni-prediction candidate list is firstly derived directly from the regular merge candidate list generation process. Denote n as the index of the uni-prediction motion in the geometric uni-prediction candidate list. The LX motion vector of the n-th merge candidate, with X equal to the parity of n, is used as the n-th uni-prediction motion vector for geometric partitioning mode. These motion vectors are marked with "x" in FIG. 5. In case a corresponding LX motion vector of the n-th extended merge candidate does not exist, the L(1-X) motion vector of the same candidate is used instead as the uni-prediction motion vector for geometric partitioning mode.

Blending Along Geometric Partition Edge

After each geometric partition is obtained using its own motion, blending is applied to the two uni-prediction signals to derive samples around geometric partition edge. The blending weight for each position of the CU are derived based on the distance from each individual sample position to the corresponding partition edge.

Figure 13:
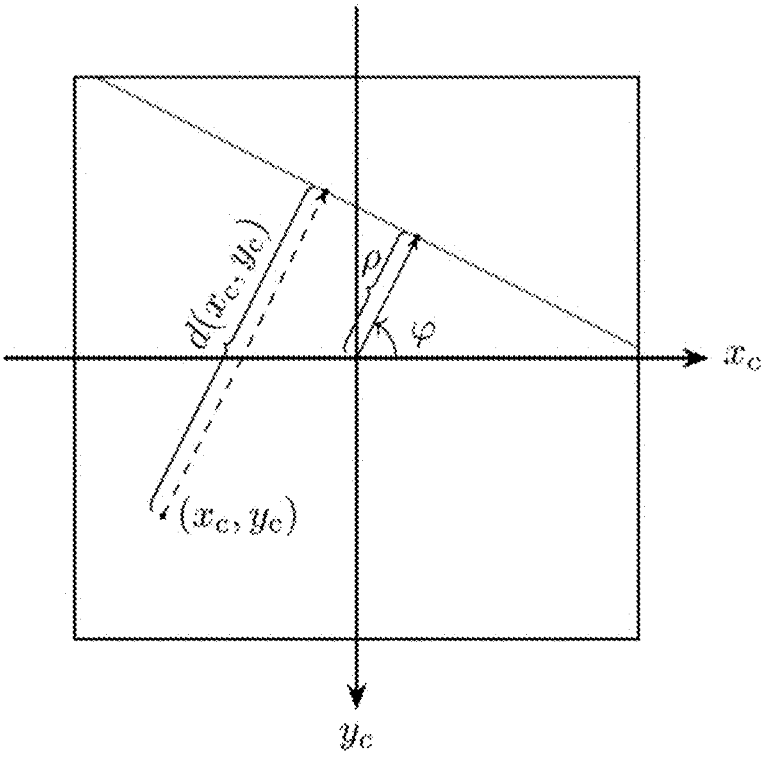
FIG. 13 illustrates a distance from an arbitrary position inside a block to partitioning edge for geometric partition mode in accordance with some examples of the present disclosure.

As shown in FIG. 13, The distance (or displacement) d(x_c,y_c) from an arbitrary position inside a block to the partitioning edge (or partitioning boundary) is mathematically defined by Hessian norm form:

$$d(x_c, y_c) = x_c\cos(\varphi) - y_c\sin(\varphi) + \rho \quad (1)$$

where $x_c$ and $y_c$ denote the position relative to the central of the block; φ denotes the angle parameter and ρ denotes the offset parameter of the partitioning boundary.

To implement the displacement calculation in practice, both angle parameter and offset parameter are quantized into integer. i.e., $$d(x_c, y_c) = ((x_c + \rho_{x,j})\cos Lut[i]) >> 3 + ((y_c + \rho_{y,j})\cos Lut[(i+8)\%32] >> 3 \quad (2)$$

where $\rho_{x,j}$ and $\rho_{y,j}$ are quantized offsets depending on the width and height of the block; and cosLut[i] denotes the quantized cosine look up table for angle parameter index i.

Finally, the continuous sample position ($x_c$, $y_c$) is quantized into integer position (m, n), and the displacement d(m, n) is given by:

$$d(m, n) = ((m + \rho_{x,j}) << 1-\mathrm{w}+1)\cos Lut[i] + ((n + \rho_{y,j}) << 1-\mathrm{h}+1)\cos Lut[(i+8)\%32]. \quad (3)$$

Figure 14:
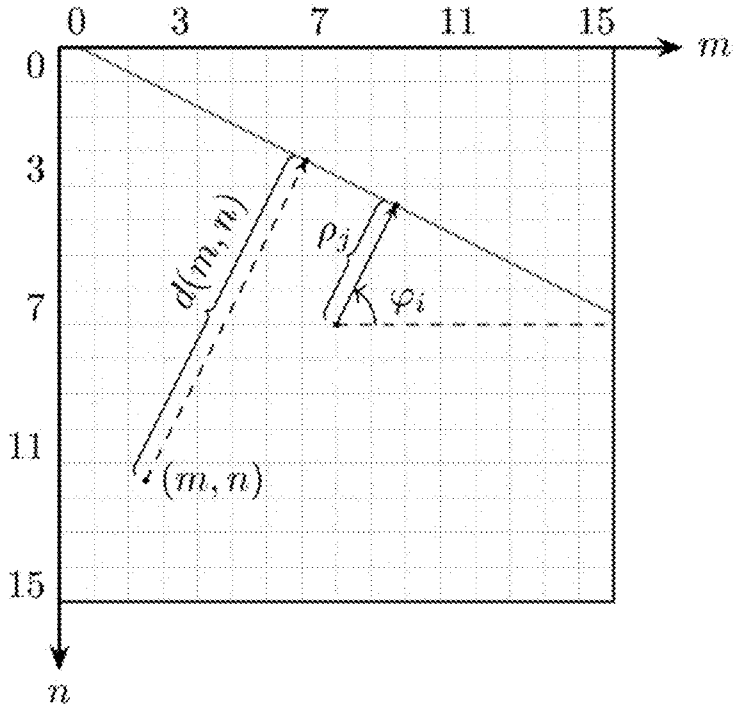
FIG. 14 illustrates an example of quantization of the distance in FIG. 13 in accordance with some examples of the present disclosure.

FIG. 14 illustrates quantization of the distance in FIG. 13 in accordance with some examples of the present disclosure.

The relationship between the quantized d(m, n) and d($x_c$, $y_c$) is given by $$d(m, n) = \lfloor 16\ d(x_c, y_c) + 0.5 \rfloor \quad (4)$$

Figure 15:
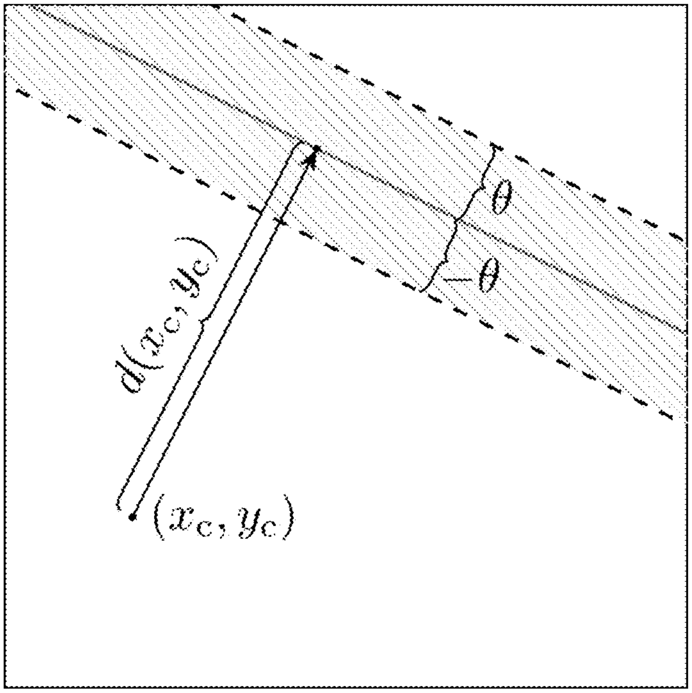
FIG. 15 illustrates a soft blending area on both sides of a partitioning boundary in accordance with some examples of the present disclosure.

FIG. 15 illustrates a soft blending area on both sides of a partitioning boundary in accordance with some examples of the present disclosure. As shown in FIG. 15, a soft blending area with a blending width of θ luma samples is defined on both sides of the partitioning boundary. Outside of the soft blending area, only weighting value 0 or 8 can be selected. Inside the soft blending area, the weighting value ω($x_c$, $y_c$) is computed using a ramp function:

$$\omega(x_c, y_c)\begin{cases} 0, & , d(x_c, y_c) \le -\theta \\ \frac{8}{2\theta}(d(x_c, y_c) + \theta), & -\theta < d(x_c, y_c) < \theta \\ 8, & , d(x_c, y_c) \ge \theta \end{cases} \quad (5)$$

This ramp function is also quantized into integer position to obtain weighting value ω(m, n), which is used in the blending process of GPM, i.e., $$\omega(m, n) = \mathrm{Clip3}(0, 8, (d(m, n) + 32 + 4) >> 3) \quad (6)$$

Two blending matrices ($W_0$ and $W_1$) are generated using these values in different positions.

The GPM predictor is then given by $$P_G = (W_0 \circ P_0 + W_1 \circ P_1 + 4) >> 3 \quad (7)$$

Motion Field Storage for Geometric Partitioning Mode

Mv1 from the first part of the geometric partition, Mv2 from the second part of the geometric partition and a combined Mv of Mv1 and Mv2 are stored in the motion field of a geometric partitioning mode coded CU.

The stored motion vector type for each individual position in the motion field are determined as:

$$sType = \mathrm{abs}(motionIdx) < 32 ? 2 : (motionIdx \le 0 ? (1 - partIdx) : partIdx) \quad (8)$$

where motionIdx is equal to d(4x+2,4y+2), which is recalculated from equation (1). The partIdx depends on the angle index i.

If sType is equal to 0 or 1, Mv1 or Mv2 are stored in the corresponding motion field, otherwise if sType is equal to 2, a combined Mv from Mv1 and Mv2 are stored. The combined Mv are generated using the following process:

(1) If Mv1 and Mv2 are from different reference picture lists (one from L0 and the other from L1), then Mv1 and Mv2 are simply combined to form the bi-prediction motion vectors.

(2) Otherwise, if Mv1 and Mv2 are from the same list, only uni-prediction motion Mv2 is stored.

GPM Signaling Design

According to the current GPM design, the usage of the GPM is indicated by signaling one flag at the CU-level. The flag is only signaled when the current CU is coded by either merge mode or skip mode. Specifically, when the flag is equal to one, it indicates the current CU is predicted by the GPM. Otherwise (the flag is equal to zero), the CU is coded by another merge mode such as regular merge mode, merge mode with motion vector differences, combined inter and intra prediction and so forth. When the GPM is enabled for the current CU, one syntax element, namely merge_gpm_partition_idx, is further signaled to indicate the applied geometric partition mode (which specifies the direction and the offset of the straight line from the CU center that splits the CU into two partitions as shown in FIG. 4). After that, two syntax elements merge_gpm_idx0 and merge_gpm_idx1 are signaled to indicate the indices of the uni-prediction merge candidates that are used for the first and second GPM partitions. More specifically, those two syntax elements are used to determine the uni-directional MVs of the two GPM partitions from the uni-prediction merge list. According to the current GPM design, in order to make two uni-directional MVs more different, the two indices cannot be the same. Based on such prior knowledge, the uni-prediction merge index of the first GPM partition is firstly signaled and used as the predictor to reduce the signaling overhead of the uni-prediction merge index of the second GPM partition. In details, if the second uni-prediction merge index is smaller than the first uni-prediction merge index, its original value is directly signaled. Otherwise (the second uni-prediction merge index is larger than the first uni-prediction merge index), its value is subtracted by one before being signaled to bit-stream. At decoder side, the first uni-prediction merge index is firstly decoded. Then, for the decoding of the second uni-prediction merge index, if the parsed value is smaller than the first uni-prediction merge index, the second uni-prediction merge index is set equal to the parse value; otherwise (the parsed value is equal to or larger than the first uni-prediction merge index), the second uni-prediction merge index is set equal to the parsed value plus one. Table 1 illustrates the existing syntax elements that are used for the GPM mode in the current VVC specification.

TABLE 1

| Existing GPM Syntax Elements in Merge Data Syntax Table of VVC Specification | |
|---|---|
| | Descriptor |
| merge_data( x0, y0, cbWidth, cbHeight, chType ) { | |
| . . . | |
| if( !ciip_flag[ x0 ][ y0 ] ) { | |
| merge_gpm_partition_idx[ x0 ][ y0 ] | ae(v) |
| merge_gpm_idx0[ x0 ][ y0 ] | ae(v) |
| if( MaxNumGpmMergeCand > 2 ) | |
| merge_gpm_idx1[ x0 ][ y0 ] | ae(v) |
| } | |
| . . . | |
| } | |

On the other hand, in the current GPM design, truncated unary code is used for the binarization of the two uni-prediction merge indices, i.e., merge_gpm_idx0 and merge_gpm_idx1. Additionally, because the two uni-prediction merge indices cannot be the same, different maximum values are used to truncate the code-words of the two uni-prediction merge indices, which are set equal to MaxGPMMergeCand−1 and MaxGPMMergeCand−2 for merge_gpm_idx0 and merge_gpm_idx1, respectively. MaxGPMMergeCand is the number of the candidates in the uni-prediction merge list. At the decoder side, when the value of received merge_gpm_idx1 is equal to or larger than that of merge_gpm_idx0, its value will be increased by 1 given that the values of merge_gpm_idx0 and merge_gpm_idx1 cannot be the same. When the GPM mode is applied, two different binarization methods are applied to translate the syntax merge_gpm_partition_idx into a string of binary bits. Specifically, the syntax element is binarized by fixed-length code and truncated binary code in the VVC.

Motion Signaling for Regular Inter Mode

Similar to the HEVC standard, besides merge/skip modes, both VVC and AVS3 allow one inter CU to explicitly specify its motion information in bitstream. In overall, the motion information signaling in both VVC and AVS3 are kept the same as that in the HEVC standard. Specifically, one inter prediction syntax, i.e., inter_pred_idc, is firstly signaled to indicate whether the prediction signal from list L0, L1 or both. For each used reference list, the corresponding reference picture is identified by signaling one reference picture index ref_idx_1x (x=0, 1) for the corresponding reference list, and the corresponding MV is represented by one MVP index mvp_1x_flag (x=0, 1) which is used to select the MV predictor (MVP), followed by its motion vector difference (MVD) between the target MV and the selected MVP. Additionally, in the VVC standard, one control flag mvd_11_zero_flag is signaled at slice level. When the mvd_11_zero_flag is equal to 0, the L1 MVD is signaled in bitstream; otherwise (when the mvd_11_zero_flag flag is equal to 1), the L1 MVD is not signaled and its value is always inferred to zero at encoder and decoder.

Bi-Prediction with CU-Level Weight

In the previous standards before VVC and AVS3, when the weighted prediction (WP) is not applied, the bi-prediction signal is generated by averaging the uni-prediction signals obtained from two reference pictures. In the VVC, one coding tool, namely bi-prediction with CU-level weight (BCW), was introduced to improve the efficiency of bi-prediction. Specifically, instead of simple averaging, the bi-prediction in the BCW is extended by allowing weighted averaging of two prediction signals, as depicted as:

$$P'(i,j)=((8-w)\cdot P_0(i,j)+w\cdot P_1(i,j)+4)>>3 \quad (9)$$

In the VVC, when the current picture is one low-delay picture (of which all the reference pictures have smaller picture order count (POC) values than the current picture), the weight of one BCW coding block is allowed to be selected from a set of predefined weight values $w\in\{-2, 3, 4, 5, 10\}$ and weight of 4 represents traditional bi-prediction case where the two uni-prediction signals are equally weighted. For low-delay, only 3 weights $w\in\{3, 4, 5\}$ are allowed. Generally speaking, though there are some design similarities between the WP and the BCW, the two coding tools are targeting at solving the illumination change problem at different granularities. However, because the interaction between the WP and the BCW could potentially complicate the VVC design, the two tools are disallowed to be enabled simultaneously. Specifically, when the WP is enabled for one slice, then the BCW weights for all the bi-prediction CUs in the slice are not signaled and inferred to be 4 (i.e., the equal weight being applied).

Template Matching

Template matching (TM) is a decoder side MV derivation method to refine the motion information of the current CU by finding the best match between one template which consists of top and left neighboring reconstructed samples of the current CU and a reference block (i.e., same size to the template) in a reference picture. As illustrated in FIG. 6, one MV is to be searched around the initial motion of the current CU within a [−8, +8]-pel search range. Best match may be defined as the MV that achieves the lowest matching cost, for example, sum of absolute difference (SAD), sum of absolute transformed difference (SATD) and so forth, between the current template and the reference template. There are two different ways to apply the TM mode for inter coding.

In AMVP mode, an MVP candidate is determined based on template matching difference to pick up the one which reaches the minimum difference between current block template and reference block template, and then TM performs only for this particular MVP candidate for MV refinement. TM refines this MVP candidate, starting from full-pel MVD precision (or 4-pel for 4-pel AMVR mode) within a [−8, +8]-pel search range by using iterative diamond search. The AMVP candidate may be further refined by using cross search with full-pel MVD precision (or 4-pel for 4-pel AMVR mode), followed sequentially by half-pel and quarter-pel ones depending on AMVR mode as specified in the below table. This search process ensures that the MVP candidate still keeps the same MV precision as indicated by AMVR mode after TM process.

TABLE 2

Search Patterns for AMVR Mode and Merge Mode

| | AMVR mode | | | | Merge mode | |
|---|---|---|---|---|---|---|
| Search pattern | 4-pel | Full-pel | Half-pel | Quarter-pel | AltIF = 0 | AltIF = 1 |
| 4-pel diamond | v | | | | | |
| 4-pel cross | v | | | | | |

TABLE 2-continued

Search Patterns for AMVR Mode and Merge Mode

| Search pattern | AMVR mode 4-pel | Full-pel | Half-pel | Quarter-pel | Merge mode AltIF = 0 | AltIF = 1 |
|---|---|---|---|---|---|---|
| Full-pel diamond | | v | v | v | v | v |
| Full-pel cross | | v | v | v | v | v |
| Half-pel cross | | | v | v | v | v |
| Quarter-pel cross | | | | v | v | |
| 1/8-pel cross | | | | | v | |

In merge mode, similar search method is applied to the merge candidate indicated by the merge index. As shown in the above table, TM may perform all the way down to 1/8-pel MVD precision or skipping those beyond half-pel MVD precision, depending on whether the alternative interpolation filter (that is used when AMVR is of half-pel mode) is used according to merged motion information.

Decoder-Side Intra Mode Derivation (DIMD)

DIMD is an intra coding tool where the luma intra prediction mode (IPM) is not transmitted via the bitstream. Instead, it is derived using previously encoded/decoded pixels, in an identical fashion at the encoder and at the decoder. The DIMD method performs a texture gradient processing to derive 2 best modes. These two modes and planar mode are then applied to the block and their predictors are weighted averaged. The selection of DIMD is signaled in the bitstream for intra coded blocks using a flag. At the decoder, if the DIMD flag is true, the intra prediction mode is derived in the reconstruction process using the same previously encoded neighboring pixels. If not, the intra prediction mode is parsed from the bitstream as in classical intra coding mode.

Figure 7:
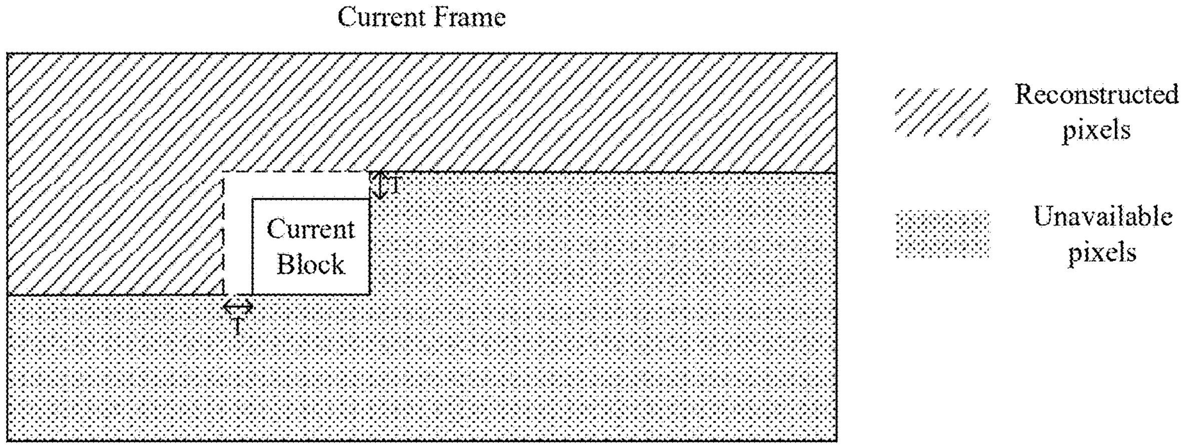
FIG. 7 illustrates a set of chosen pixels on which a gradient analysis is performed in accordance with some examples of the present disclosure.

To derive the intra prediction mode for a block, a set of neighboring pixels must be selected first and a gradient analysis will be performed on the set of neighboring pixels. For normativity purposes, these pixels should be in the decoded/reconstructed pool of pixels. As shown in FIG. 7, a template is chosen surrounding the current block by T pixels to the left, and T pixels above. Next, a gradient analysis is performed on the pixels of the template. This allows to determine a main angular direction for the template, which is assumed to (and that is the core premise of the proposed method) have a high chance to be identical to the one of the current block. A simple 3×3 Sobel gradient filter is used and defined by the following matrices that will be convoluted with the template:

$$M_x = \begin{bmatrix} -1 & 0 & 1 \\ -2 & 0 & 2 \\ -1 & 0 & 1 \end{bmatrix} \text{ and } M_y = \begin{bmatrix} -1 & -2 & -1 \\ 0 & 0 & 0 \\ 1 & 2 & 1 \end{bmatrix} \quad (10)$$

For each pixel of the template, each of these two matrices is point-by-point multiplied with the 3×3 window centered around the current pixel and composed of its 8 direct neighbors, and sum the result. Thus, two values Gx (from the multiplication with Mx), and Gy (from the multiplication with My) are obtained corresponding to the gradient at the current pixel, in the horizontal and vertical direction respectively.

Figure 8:
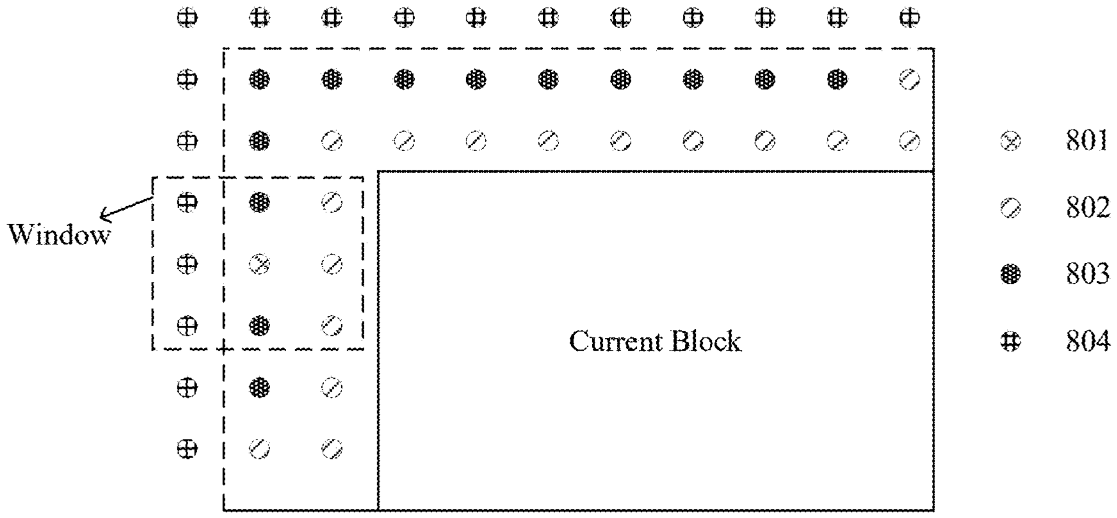
FIG. 8 illustrates convolution of a 3×3 Sobel gradient filter in accordance with some examples of the present disclosure.

FIG. 8 shows the convolution process. The pixel 801 is the current pixel. Pixels 803 (including the pixel 801) are pixels on which the gradient analysis is possible. Pixels 802 are pixels on which the gradient analysis is not possible due to lack of some neighbors. Pixels 804 are available (reconstructed) pixels outside of the considered template, used in the gradient analysis of the pixels 803. In case a pixel 804 is not available (due to blocks being too close to the border of the picture for instance), the gradient analysis of all pixels 803 that use this pixel 804 is not performed. For each pixel 803, the intensity (G) and the orientation (O) of the gradient are computed using Gx and Gy as such:

$$G = |G_x| + |G_y| \text{ and } 0 = \operatorname{atan}\left(\frac{G_y}{G_x}\right) \quad (11)$$

The orientation of the gradient is then converted into an intra angular prediction mode, used to index a histogram (first initialized to zero). The histogram value at that intra angular mode is increased by G. Once all the pixels 803 in the template have been processed, the histogram will contain cumulative values of gradient intensities, for each intra angular mode. The IPMs corresponding to two tallest histogram bars are selected for the current block. If the maximum value in the histogram is 0 (indicating no gradient analysis was able to be made, or the area composing the template is flat), then the DC mode is selected as intra prediction mode for the current block.

Figure 9:
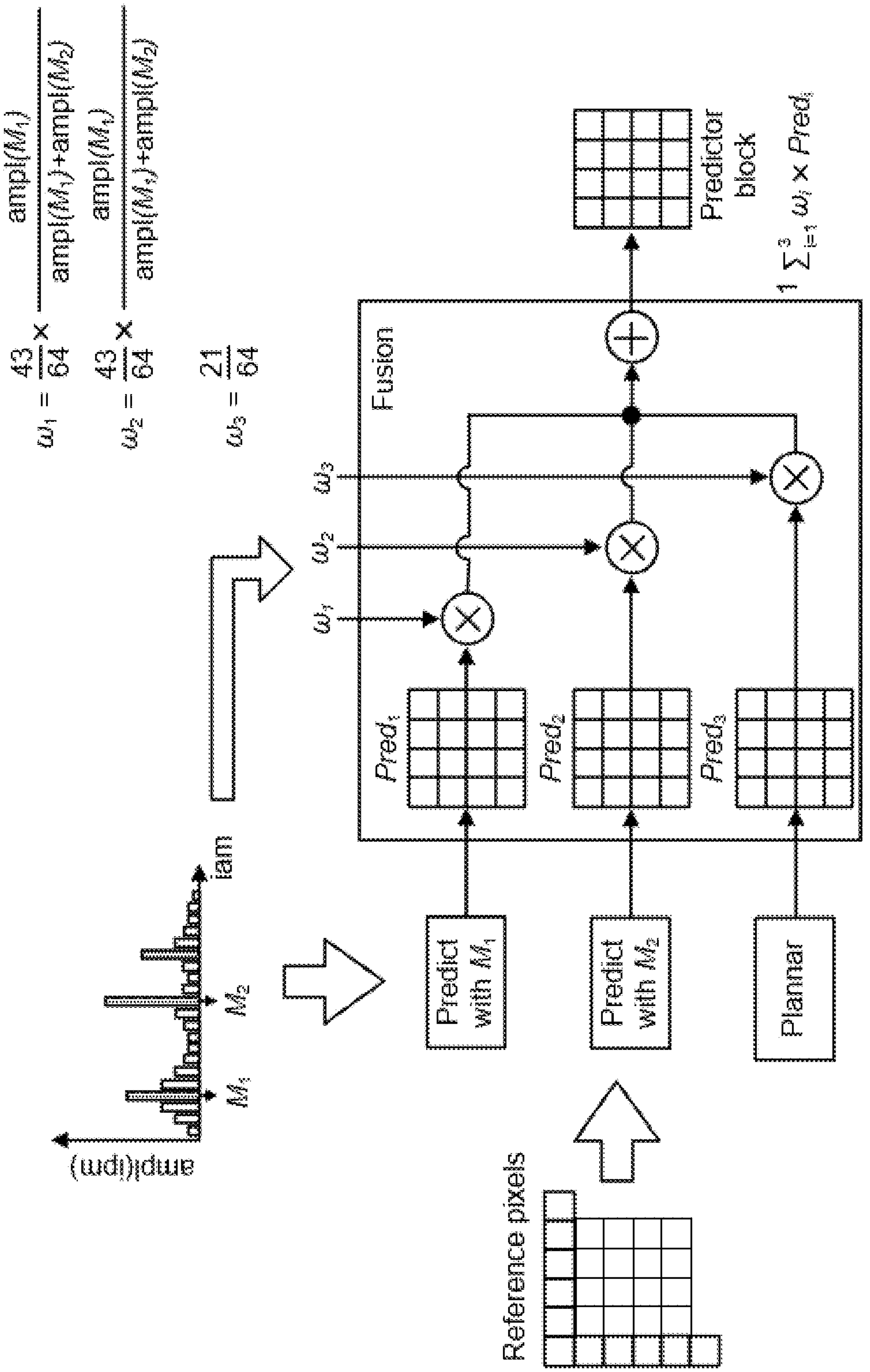
FIG. 9 illustrates prediction fusion by weighted averaging of two HoG modes and planar in accordance with some examples of the present disclosure.

The two IPMs corresponding to two tallest histogram of oriented gradient (HoG) bars are combined with the Planar mode. The prediction fusion is applied as a weighted average of the above three predictors. To this aim, the weight of planar is fixed to 21/64 (~1/3). The remaining weight of 43/64 (~2/3) is then shared between the two HoG IPMs, proportionally to the amplitude of their HoG bars. FIG. 9 visualizes this process.

Derived intra modes are included into the primary list of intra most probable modes (MPM), so the DIMD process is performed before the MPM list is constructed. The primary derived intra mode of a DIMD block is stored with a block and is used for MPM list construction of the neighboring blocks.

Template-Based Intra Mode Derivation (TIMD)

Figure 10:
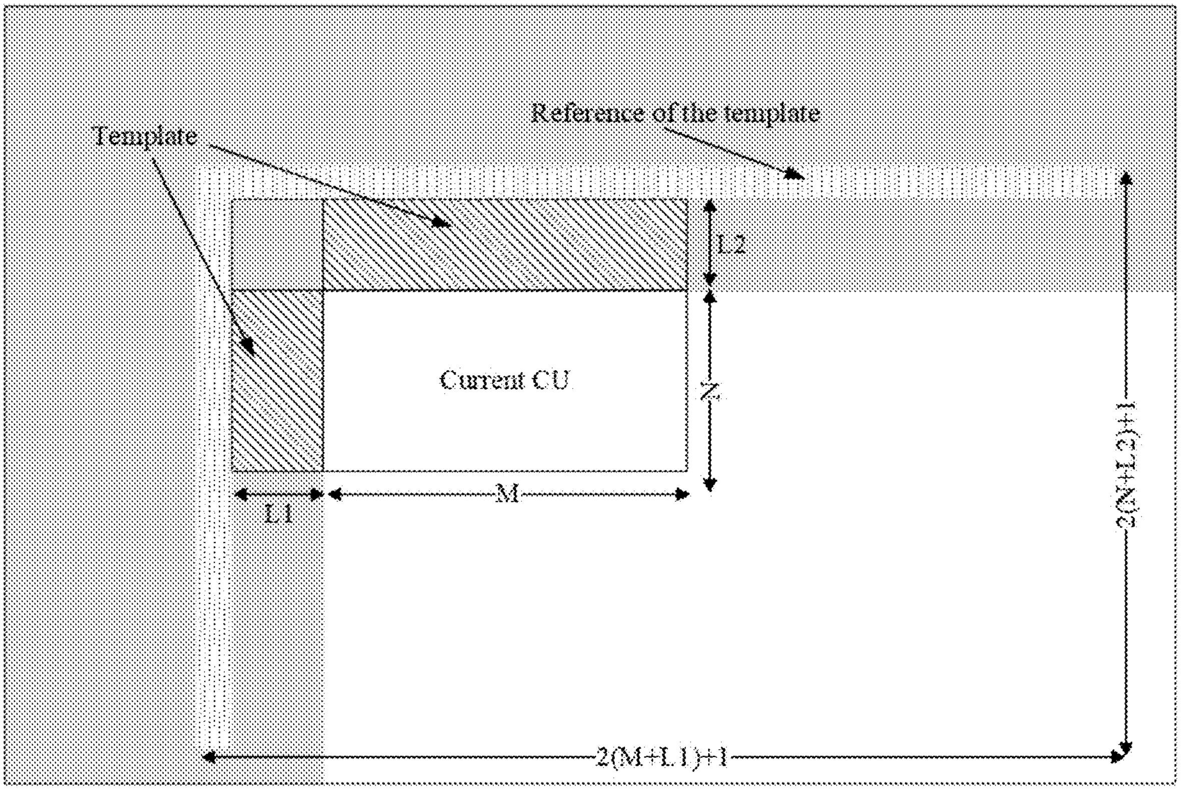
FIG. 10 illustrates a template and its reference samples used in TIMD in accordance with some examples of the present disclosure.

For each intra mode in MPMs, the sum of absolute transformed differences (SATD) between prediction and reconstruction samples of the template region shown in FIG. 10 is computed and the intra modes with the first two modes with the smallest SATD cost are chosen and then fused with the weights, and such weighted intra prediction is used to code the current CU.

The costs of the two selected modes are compared with a threshold, in the test the cost factor of 2 is applied as follows:

$$costMode2 < 2 * costMode1.$$

If this condition is true, the fusion is applied, otherwise the only model is used.

Weights of the modes are computed from their SATD costs as follows:

$$\text{weight1} = costMode2 / (costMode1 + costMode2)$$

$$\text{weight2} = 1 - \text{weight1}.$$

Geometric Partitioning Mode with Template Matching (TM)

In ECM, template matching (TM) is applied on top of the geometric partitioning mode. When GPM is enabled for the current CU, two sets of uni-directional motion information of GPM are derived from the GPM merge candidate list for each part of GPM, respectively. The GPM merge candidate list is constructed as follows.

First, interleaved List-0 MV candidates and List-1 MV candidates are derived directly from the regular merge candidate list, where List-0 MV candidates are higher priority than List-1 MV candidates. A pruning method with an adaptive threshold based on the current CU size is applied to remove redundant MV candidates.

Second, interleaved List-1 MV candidates and List-0 MV candidates are further derived directly from the regular merge candidate list, where List-1 MV candidates are higher priority than List-0 MV candidates. The same pruning method with the adaptive threshold is also applied to remove redundant MV candidates.

Third, zero MV candidates are padded until the GPM candidate list is full.

A CU-level flag is further signaled to indicate that TM is enabled for GPM, that is, both motion vectors of GPM are further refined using template matching. During this template matching, one of following template type may be used for the refinement, i.e., above (A), left (L), above plus left (A+L) of the current block. In the current ECM3.1 (adopted from JVET W0065), the template type is selected based on the angle parameter of GPM, as in Table 3 below.

TABLE 3

Selection of Template Type

| Partition angle | 0 | 2 | 3 | 4 | 5 | 8 | 11 | 12 | 13 | 14 |
|---|---|---|---|---|---|---|---|---|---|---|
| 1st partition | A | A | A | A | L + A | L + A | L + A | L + A | A | A |
| 2nd partition | L + A | L + A | L + A | L | L | L | L | L + A | L + A | L + A |
| **Partition angle** | **16** | **18** | **19** | **20** | **21** | **24** | **27** | **28** | **29** | **30** |
| 1st partition | A | A | A | A | L + A | L + A | L + A | L + A | A | A |
| 2nd partition | L + A | L + A | L + A | L | L | L | L | L + A | L + A | L + A |

The motion is then refined by minimizing the difference between the current template and the template in the reference picture using the same search pattern of merge mode with half-pel interpolation filter disable.

Template Matching-Based Reordering for GPM Split Modes

In VVC and ECM-3.1, there are 64 GPM split modes and the use of split mode of each GPM coding unit (CU) is signaled using fixed-length binary code. This coding method could imply that all GPM split modes are treated as equal-probable events, and thus a fixed-length code could be used accordingly for signaling.

Template matching-based GPM split modes reordering method is first proposed in the JVET document JVET-Y0135. The template-matching cost for each GPM split mode is calculated and the split modes are reordered based on the cost both at the encoder and decoder side. Only the best N, where N is smaller than or equal to 64, candidates are available. The GPM mode index is signaled using Golomb-Rice code instead of fixed-length binary code.

The reordering method for GPM split modes is a two-step process after the respective reference templates of the two GPM partitions in a coding unit are generated, as follows:

blending the reference templates of the two GPM partitions using the respective weights of split modes (i.e., resulting in 64 blended reference templates) and computing the respective TM costs of these blended reference templates;

reordering the TM costs in ascending order and marking the best N candidates as available split modes.

Figure 11:
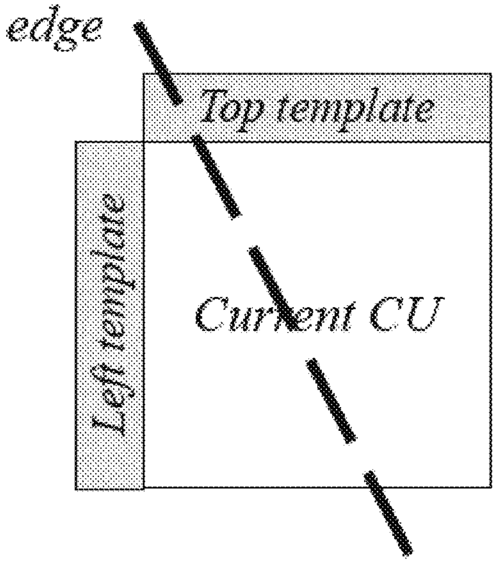
FIG. 11 illustrates blending of template used for reordering of GPM split modes in accordance with some examples of the present disclosure.

The edge on the template is extended from that of the current CU, as FIG. 11 illustrates. The corresponding weights used in the blending process of templates are computed similar to the GPM weight derivation process. The only difference is as follows:

the sample positions (relative to the original of the CU) on the template are used to derive weights;

weights are mapped to 0 and 8 before use depending on whichever is closer and thus the edge on templates is clean cut for computational simplification in the blending process of templates.

GPM with Inter and Intra Prediction

In the previous GPM design, the final prediction is generated using two uni-predicted inter predictions. A method that combines inter and intra prediction for GPM were introduced by JVET-X0166 and JVET-Y0065.

Figure 12A:
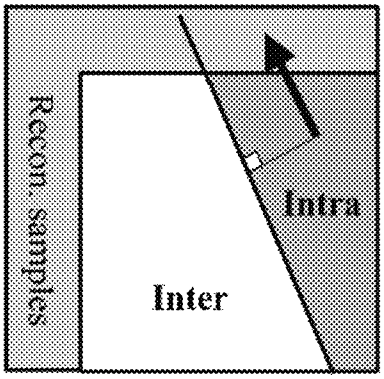
FIGS. 12A to 12C illustrates available IPM candidates for GPM with inter and intra prediction in accordance with some examples of the present disclosure.
Figure 12B:
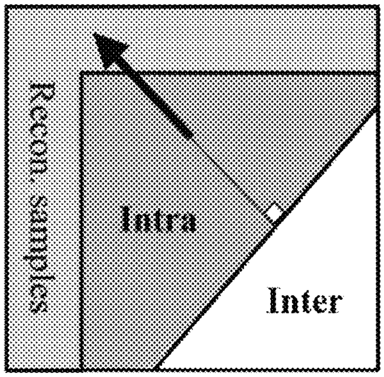
Figure 12C:
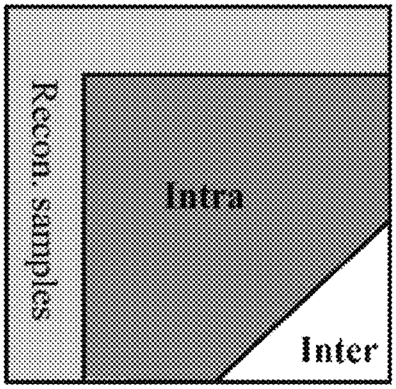
Figure 12D:
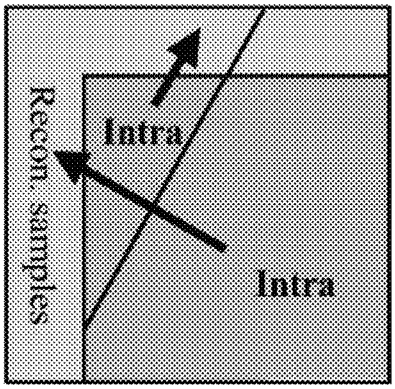
FIG. 12D illustrates a disabled combination for GPM with inter and intra prediction in accordance with some examples of the present disclosure.

In GPM with inter and intra prediction, the final prediction samples are generated by weighting inter predicted samples and intra predicted samples for each GPM-separated region. Each part contains flag to indicate whether inter or intra prediction is used. The inter predicted samples are derived by the same scheme of the current GPM, whereas the intra predicted samples are derived by an intra prediction mode (IPM) candidate list and an index signaled from the encoder. The IPM candidate list size is pre-defined as 3. The available IPM candidates are the parallel angular mode against the GPM block boundary (Parallel mode as shown in FIG. 12A), the perpendicular angular mode against the GPM block boundary (Perpendicular mode as shown in FIG. 12B), and the Planar mode as shown in FIG. 12C, respectively. Furthermore, GPM with intra and intra prediction as shown FIG. 12D is restricted in the method to reduce the signaling overhead for IPMs and avoid an increase in the size of the intra prediction circuit on the hardware decoder. In addition, a direct motion vector and IPM storage on the GPM-blending area is introduced to further improve the coding performance.

Furthermore, the IPM list of GPM intra can be further improved by DIMD, TIMD, and angular modes from the neighboring blocks. More specifically, the parallel mode is used in the first place of IPM list, then IPM candidates of TIMD, DIMD, and angular modes from neighbors are used, pruning between candidates are performed.

As for the neighboring mode derivation, there are five positions for available neighboring blocks at most, but they are restricted by the angle of GPM block boundary as shown in Table 4 below.

TABLE 4

| Positions of Neighboring Blocks Restricted by Angle of GPM | | | | | | | | | | |
|---|---|---|---|---|---|---|---|---|---|---|
| Angle of GPM | 0 | 2 | 3 | 4 | 5 | 8 | 11 | 12 | 13 | 14 |
| 1st partition | A | A | A | A | L + A | L + A | L + A | L + A | A | A |
| 2nd partition | L + A | L + A | L + A | L | L | L | L | L + A | L + A | L + A |
| Angle of GPM | 16 | 18 | 19 | 20 | 21 | 24 | 27 | 28 | 29 | 30 |
| 1st partition | A | A | A | A | L + A | L + A | L + A | L + A | A | A |
| 2nd partition | L + A | L + A | L + A | L | L | L | L | L + A | L + A | L + A |

The motion is then refined by minimizing the difference between the current template and the template in the reference picture using the same search pattern of merge mode with half-pel interpolation filter disable.

GPM Adaptive Blending

The GPM adaptive blending method has been disclosed in JVET-Z0127.

Figure 16:
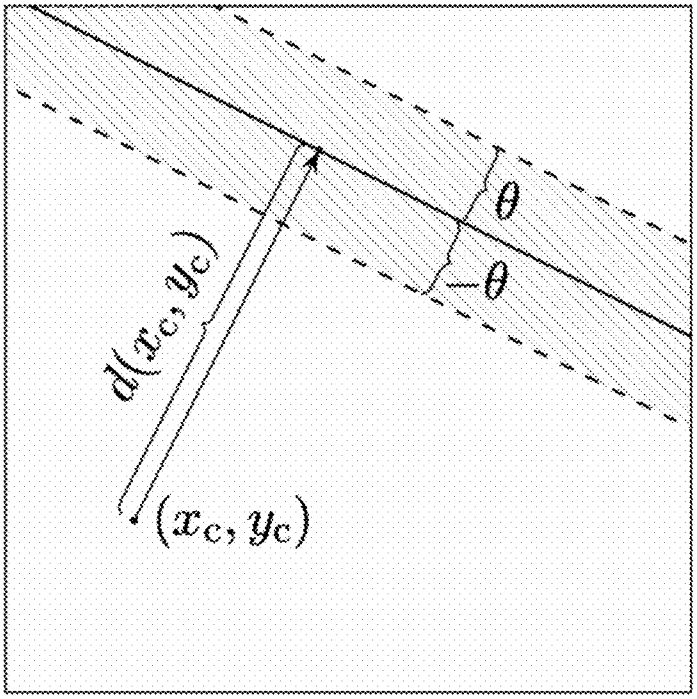
FIG. 16 illustrates a GPM blending in the current ECM 4.0 in accordance with some examples of the present disclosure.

During the VVC development, the Geometric Partitioning Mode (GPM) was adopted. During the ECM development, GPM was further enhanced by, e.g., GPM+TM, GPM+MMVD, and Inter+Intra GPM. However, the blending strength of GPM has not been improved since the original GPM design. That is, as shown in FIG. 16, the blending strength, blending area width, or blending width θ is fixed for all different contents.

The weighing values in the blending mask can be given by a ramp function $$\omega_{x_c,y_c}\begin{cases} 0 & d(x_c, y_c) \le -\theta \\ \frac{8}{2\theta}(d(x_c, y_c)+\theta) & -\theta < d(x_c, y_c) < \theta \\ 8 & d(x_c, y_c) \ge \theta, \end{cases} \quad (12)$$

With a fixed θ=2 pel in the current ECM (VVC) design, this ramp function can be quantized as $$\omega_{m,n} = \text{Clip3}(0, 8, (d(m, n) + 32 + 4) >> 3) \quad (13)$$

It is asserted that such design may not be always optimal because the fixed blending area width cannot always provide the best blending quality for various types of video contents. For example, screen video contents usually contain strong textures and sharp edges, which refers a narrow blending area to reserve the edge information. For camera-captured content, blending is generally required; but the blending area width is dependent on a number of factors, e.g., the actual boundaries of the moving objects and the motion distinctiveness of two partitions.

To resolve the abovementioned issue, one adaptive blending scheme is proposed for the GPM, which dynamically adjusts the width of the blending area surround the GPM partition boundary. Specifically, the width of the blending area (i.e., θ) is allowed to be selected from a set of pre-defined values, e.g., {0, 1, 2, 4, 8}. The optimal blending area width is determined for each GPM CU at the encoder and signaled to the decoder based on one syntax element merge_gpm_blending_width_idx. In the scheme, all pre-defined blending strength values are shiftable while all the clipping and shifting operations in the existing GPM blending process can be kept without any changes.

In addition, the range of the weights is increased from [0, 8] to [0, 32] to accommodate the increased width of the GPM blending area. Specifically, the weights are calculated as $$\omega_{x_c,y_c} = \begin{cases} \text{Clip3}(0, 32, (d(m, n) + 16\theta + (\theta >> 1)) >> \log_2\theta) & \theta \ne 0 \\ d(m, n) > 0 ? 32 : 0 & \theta = 0 \end{cases} \quad (14)$$

Deblocking Filter

Deblocking filtering process is similar to those in HEVC. In VVC, the deblocking filtering process is applied on a CU boundaries, transform subblock boundaries and prediction subblock boundaries. The prediction subblock boundaries include the prediction unit boundaries introduced by the SbTMVP and affine modes, and the transform subblock boundaries include the transform unit boundaries introduced by SBT and ISP modes, and transforms due to implicit split of large CUs. As done in HEVC, the processing order of the deblocking filter is defined as horizontal filtering for vertical edges for the entire picture first, followed by vertical filtering for horizontal edges. This specific order enables either multiple horizontal filtering or vertical filtering processes to be applied in parallel threads, or can still be implemented on a CTB-by-CTB basis with only a small processing latency. Compared to HEVC deblocking, the following modifications are introduced.

- The filter strength of the deblocking filter dependent of the averaged luma level of the reconstructed samples.
- Deblocking tC table extension and adaptation to 10-bit video
- 4×4 grid deblocking for luma
- Stronger deblocking filter for luma
- Stronger deblocking filter for chroma
- Deblocking filter for subblock boundary
- Deblocking decision adapted to smaller difference in motion In VVC and ECM, motion information is stored for temporal motion vector prediction. In the GPM of VVC, bi-directional motion is stored in the blending area which may benefit temporal motion vector prediction. However, in the current ECM, when GPM with inter and intra prediction is enabled only uni-directional motion is stored which maybe not efficient for the coding performance.

Methods and devices are provided to further improve the motion storage of GPM in the ECM. In VVC, the motion field of the CU with GPM consists of three parts: Mv1 from the first part of the geometric partition, Mv2 from the second part of the geometric partition and a combined Mv of Mv1 and Mv2. However, in the current ECM when GPM with intra and inter prediction is enabled, only Mv1 and Mv2 are stored in the motion field of the CU with GPM.

Motion Storage for GPM with Inter and Inter Prediction

In one or more embodiments, it is proposed to store Mv1, Mv2 and combined Mv of Mv1 and Mv2 in the motion field of CU with GPM inter and inter prediction as VVC. The stored motion vector type for each individual position in the motion field are determined as:

$$sType = abs(motionIdx) < 32 ? 2 : (motionIdx \le 0 ? (1 - partIdx) : partIdx) \quad (15)$$

where motionIdx is equal to d(4x+2,4y+2), which is recalculated from equation (1). The partIdx depends on the angle index i.

If sType is equal to 0 or 1, Mv1 or Mv2 are stored in the corresponding motion field, otherwise if sType is equal to 2, a combined Mv from Mv1 and Mv2 are stored. The combined Mv are generated using the following process:

- If Mv1 and Mv2 are from different reference picture lists (one from L0 and the other from L1), then Mv1 and Mv2 are simply combined to form the bi-prediction motion vectors.
- Otherwise, if Mv1 and Mv2 are from the same list, only uni-prediction motion Mv2 is stored.

Motion Storage for GPM with Intra and Inter Prediction

In the current ECM, if the CU is coded with GPM with intra and inter prediction, no motion information is stored in the motion field of the intra partition while uni-prediction motion is stored in the motion field of the inter partition. In some embodiments, the motion storage for GPM with intra and inter is modified as follow:

- If sType equals to 2, the motion information of the inter partition is stored.
- If partition 1 is intra partition, partition 2 is inter partition
  - If sType equals 0, no motion information is stored.
  - If sType equals 1, motion information is of the inter partition is stored.
- If partition 1 is inter partition, partition 2 is intra partition
  - If sType equals 0, motion information of the inter partition is stored.
  - If sType equals 1, no motion information is stored.

Motion Storage for GPM with Adaptive Blending

In JVET-Z0127, GPM with adaptive blending is proposed. When GPM with adaptive blending is enabled, the blending area may vary for different blending width θ. In some embodiments, the calculation of sType is modified as follow for GPM with adaptive blending:

$$sType = abs(motionIdx) < 16 * \theta ? 2 : (motionIdx \le 0 ? (1 - partIdx) : partIdx) \quad (16)$$

Figure 18:
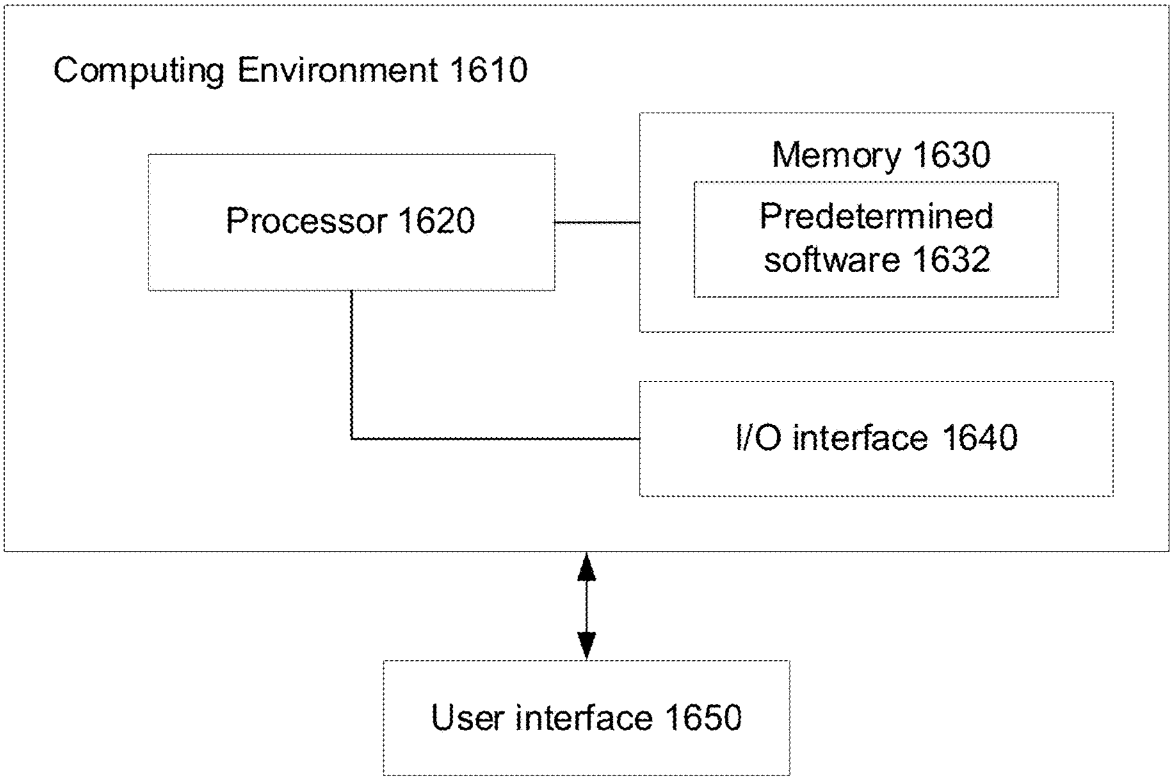
FIG. 18 is a diagram illustrating a computing environment coupled with a user interface in accordance with some examples of the present disclosure.

FIG. 18 shows a computing environment 1610 coupled with a user interface 1650. The computing environment 1610 can be part of a data processing server. The computing environment 1610 includes a processor 1620, a memory 1630, and an Input/Output (I/O) interface 1640.

The processor 1620 typically controls overall operations of the computing environment 1610, such as the operations associated with display, data acquisition, data communications, and image processing. The processor 1620 may include one or more processors to execute instructions to perform all or some of the steps in the above-described methods. Moreover, the processor 1620 may include one or more modules that facilitate the interaction between the processor 1620 and other components. The processor may be a Central Processing Unit (CPU), a microprocessor, a single chip machine, a Graphical Processing Unit (GPU), or the like.

The memory 1630 is configured to store various types of data to support the operation of the computing environment 1610. The memory 1630 may include predetermined software 1632. Examples of such data includes instructions for any applications or methods operated on the computing environment 1610, video datasets, image data, etc. The memory 1630 may be implemented by using any type of volatile or non-volatile memory devices, or a combination thereof, such as a Static Random Access Memory (SRAM), an Electrically Erasable Programmable Read-Only Memory (EEPROM), an Erasable Programmable Read-Only Memory (EPROM), a Programmable Read-Only Memory (PROM), a Read-Only Memory (ROM), a magnetic memory, a flash memory, a magnetic or optical disk.

The I/O interface 1640 provides an interface between the processor 1620 and peripheral interface modules, such as a keyboard, a click wheel, buttons, and the like. The buttons may include but are not limited to, a home button, a start scan button, and a stop scan button. The I/O interface 1640 can be coupled with an encoder and decoder.

In one or more examples, there is also provided a non-transitory computer-readable storage medium comprising a plurality of programs, for example, in the memory 1630, executable by the processor 1620 in the computing environment 1610, for performing the above-described methods. Alternatively, the non-transitory computer-readable storage medium may have stored therein a bitstream or a data stream comprising encoded video information (for example, video information comprising one or more syntax elements) generated by an encoder (for example, the video encoder 20 in FIG. 17) using, for example, the encoding method described above for use by a decoder (for example, the video decoder 30 in FIG. 17) in decoding video data. The non-transitory computer-readable storage medium may be, for example, a ROM, a Random Access Memory (RAM), a CD-ROM, a magnetic tape, a floppy disc, an optical data storage device or the like.

In one or more examples, the is also provided a computing device comprising one or more processors (for example, the processor 1620); and the non-transitory computer-readable storage medium or the memory 1630 having stored therein a plurality of programs executable by the one or more processors, where the one or more processors, upon execution of the plurality of programs, are configured to perform the above-described methods.

In one or more embodiments, there is also provided a computer program product comprising a plurality of programs, for example, in the memory 1630, executable by the processor 1620 in the computing environment 1610, for performing the above-described methods. For example, the computer program product may include the non-transitory computer-readable storage medium.

In one or more examples, the computing environment 1610 may be implemented with one or more ASICs, DSPs, Digital Signal Processing Devices (DSPDs), Programmable Logic Devices (PLDs), FPGAs, GPUs, controllers, microcontrollers, microprocessors, or other electronic components, for performing the above methods.

The description of the present disclosure has been presented for purposes of illustration and is not intended to be exhaustive or limited to the present disclosure. Many modifications, variations, and alternative implementations will be apparent to those of ordinary skill in the art having the benefit of the teachings presented in the foregoing descriptions and the associated drawings.

Unless specifically stated otherwise, an order of steps of the method according to the present disclosure is only intended to be illustrative, and the steps of the method according to the present disclosure are not limited to the order specifically described above, but may be changed according to practical conditions. In addition, at least one of the steps of the method according to the present disclosure may be adjusted, combined or deleted according to practical requirements.

The examples were chosen and described in order to explain the principles of the disclosure and to enable others skilled in the art to understand the disclosure for various implementations and to best utilize the underlying principles and various implementations with various modifications as are suited to the particular use contemplated. Therefore, it is to be understood that the scope of the disclosure is not to be limited to the specific examples of the implementations disclosed and that modifications and other implementations are intended to be included within the scope of the present disclosure.

Figure 20:
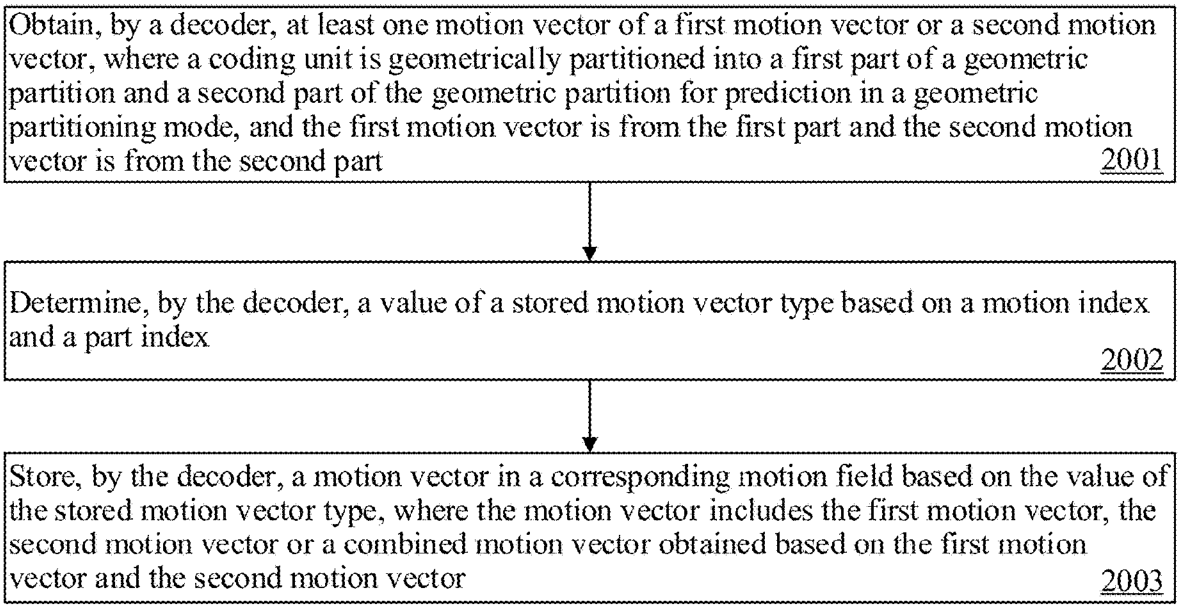
FIG. 20 is a flow chart illustrating a method for video decoding in accordance with some examples of the present disclosure.

FIG. 20 is a flowchart illustrating a method for video decoding according to an example of the present disclosure. The example method may be implemented by a decoder.

In step 2001, the processor 1620, at the decoder side, may obtain at least one motion vector of a first motion vector or a second motion vector, where a coding unit is geometrically partitioned into a first part of a geometric partition and a second part of the geometric partition for prediction in a geometric partitioning mode, and the first motion vector is from the first part and the second motion vector is from the second part. For example, as shown in FIG. 4, a CU is split into two parts by a geometrically located straight line.

In step 2002, the processor 1620, at the decoder side, may determine a value of a stored motion vector type based on a motion index and a part index.

In step 2003, the processor 1620, at the decoder side, may store a motion vector in a corresponding motion field based on the value of the stored motion vector type, where the motion vector may include the first motion vector, the second motion vector, or a combined motion vector obtained based on the first motion vector and the second motion vector.

In some examples, the processor 1620 may further determine the value of the stored motion vector type based on a blending width, the motion index and the part index. The stored motion vector type may be, but not limited to, sType in equation (15) or (16). The blending width may be the blending width or the blending area width θ as shown in FIG. 15 or 16. The motion index may be, but not limited to, motionIdx in equation (15) or (16) and the part index may be, but not limited to, partIdx in equation (15) or (16).

In some examples, the value of the blending width depends on a blending width index, and the part index depends on an angle index. In some examples, the angle index indicates an index of angle parameter of the partition mode of the geometric partition.

In some examples, the first part of the geometric partition and the second part of the geometric partition are both predicted with inter mode.

In another example, when the value of the stored motion vector type is 0 or 1, the decoder stores the first motion vector or the second motion vector in a corresponding motion field; and when the value of the stored motion vector type is 2, the decoder obtains a combined motion vector based on the first motion vector and the second motion vector and stores the combined motion vector in a corresponding motion field.

In one example, when the first motion vector and the second motion vector are from different reference picture in different reference picture lists, the decoder determines that the combined motion vector is the combination of the first motion vector and the second motion vector, where the combined motion vector is a bi-prediction motion vector; and when the first motion vector and the second motion vector are from reference pictures in a same reference picture list, the decoder determines that the combined motion vector is the second motion vector, where the combined motion vector is a uni-prediction motion vector.

In one example, the geometric partitioning mode is intra and inter prediction.

In another example, the decoder stores the first motion vector or the second motion vector as a uni-prediction motion vector in a corresponding motion field.

In one example, when the value of the stored motion vector type is 2, the decoder stores a motion vector of inter partition in a corresponding motion field.

In one example, the first part of the geometric partition is an intra partition and the second part of the geometric partition is an inter partition.

In another example, when the value of the stored motion vector type is 0, the decoder stores no motion vector in a corresponding motion field.

In some examples, when the value of the stored motion vector type is 1, the decoder stores a motion vector of the inter partition in a corresponding motion field, where the motion vector of the inter partition is the second motion vector.

In one example, the first part of the geometric partition is an inter partition and the second part of the geometric partition is an intra partition.

In another example, when the value of the stored motion vector type is 0, the decoder stores a motion vector of the inter partition in a corresponding motion field, where the motion vector of the inter partition is the first motion vector.

In another example, when the value of the stored motion vector type is 1, the decoder stores, no motion vector in a corresponding motion field.

Figure 21:
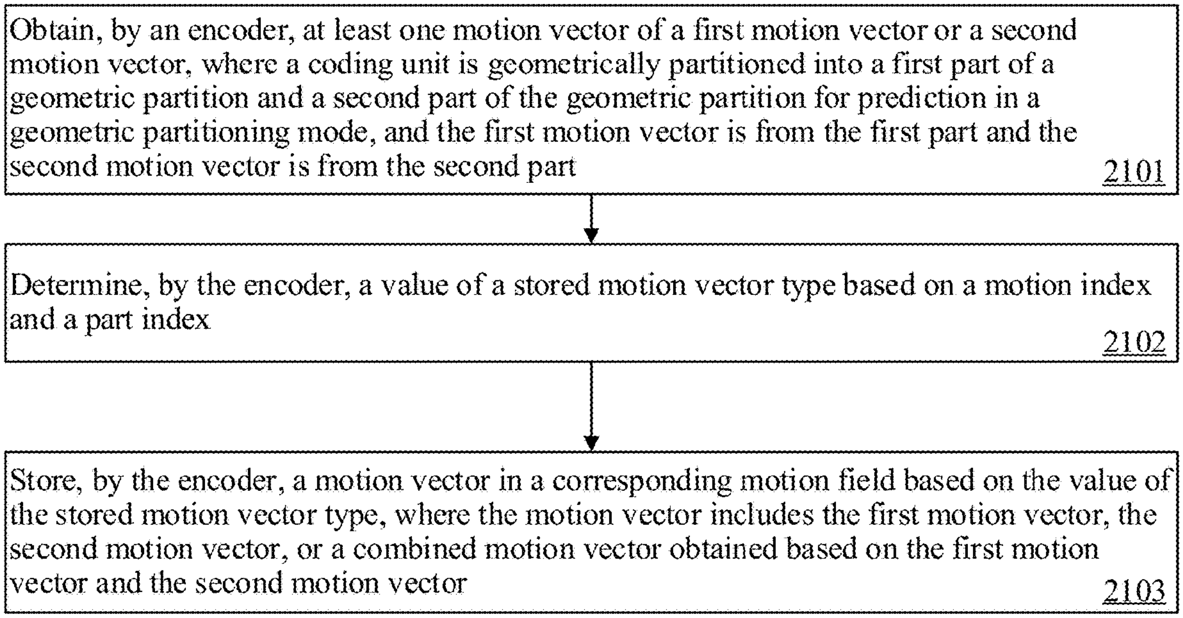
FIG. 21 is a flow chart illustrating a method for video encoding corresponding to the method for video decoding as shown in FIG. 20 in accordance with some examples of the present disclosure.

FIG. 21 is a flowchart illustrating a method for video encoding corresponding the method for video decoding as shown in FIG. 20. The example method may be implemented by an encoder.

In step 2101, the processor 1620, at the encoder side, may obtain at least one motion vector of a first motion vector or a second motion vector, where a coding unit is geometrically partitioned into a first part of a geometric partition and a second part of the geometric partition for prediction in a geometric partitioning mode, and the first motion vector is from the first part and the second motion vector is from the second part. For example, as shown in FIG. 4, a CU is split into two parts by a geometrically located straight line.

In step 2102, the processor 1620, at the encoder side, may determine a value of a stored motion vector type based on a motion index and a part index.

In step 2103, the processor 1620, at the encoder side, may store a motion vector in a corresponding motion field based on the value of the stored motion vector type, where the motion vector may include the first motion vector, the second motion vector, or a combined motion vector obtained based on the first motion vector and the second motion vector.

In some examples, the processor 1620 may further determine the value of the stored motion vector type based on a blending width, the motion index and the part index. The stored motion vector type may be, but not limited to, sType in equation (15) or (16). The blending width may be the blending width or the blending area width θ as shown in FIG. 15 or 16. The motion index may be, but not limited to, motionIdx in equation (15) or (16) and the part index may be, but not limited to, partIdx in equation (15) or (16).

In some examples, the value of the blending width depends on a blending width index, and the part index depends on an angle index. In some examples, the angle index indicates an index of angle parameter of the partition mode of the geometric partition.

In some examples, the first part of the geometric partition and the second part of the geometric partition are both predicted with inter mode.

In another example, when the value of the stored motion vector type is 0 or 1, the encoder stores the first motion vector or the second motion vector in a corresponding motion field; and when the value of the stored motion vector type is 2, the encoder obtains the combined motion vector based on the first motion vector and the second motion vector and stores the combined motion vector in a corresponding motion field.

In one example, when the first motion vector and the second motion vector are from different reference pictures in different reference picture lists, the encoder determines that the combined motion vector is the combination of the first motion vector and the second motion vector, where the combined motion vector is a bi-prediction motion vector; and when the first motion vector and the second motion vector are from reference pictures in a same reference picture list, the encoder determines that the combined motion vector is the second motion vector, where the combined motion vector is a uni-prediction motion vector.

In one example, the geometric partitioning mode is intra and inter prediction.

In another example, the encoder stores the first motion vector or the second motion vector as a uni-prediction motion vector in a corresponding motion field.

In one example, when the value of the stored motion vector type is 2, the encoder stores a motion vector of inter partition in a corresponding motion field.

In one illustration, the first part of the geometric partition is an intra partition and the second part of the geometric partition is an inter partition.

In another example, when the value of the stored motion vector type is 0, the encoder stores no motion vector in a corresponding motion field.

In some examples, when the value of the stored motion vector type is 1, the encoder stores a motion vector of the inter partition in a corresponding motion field, where the motion vector of the inter partition is the second motion vector.

In one example, the first part of the geometric partition is an inter partition and the second part of the geometric partition is an intra partition.

In another example, when the value of the stored motion vector type is 0, the encoder stores a motion vector of the inter partition in a corresponding motion field, where the motion vector of the inter partition is the first motion vector.

In another example, when the value of the stored motion vector type is 1, the encoder stores, no motion vector in a corresponding motion field.

The above methods may be implemented using an apparatus that includes one or more circuitries, which include application specific integrated circuits (ASICs), digital signal processors (DSPs), digital signal processing devices (DSPDs), programmable logic devices (PLDs), field programmable gate arrays (FPGAs), controllers, micro-controllers, microprocessors, or other electronic components. The apparatus may use the circuitries in combination with the other hardware or software components for performing the above described methods. Each module, sub-module, unit, or sub-unit disclosed above may be implemented at least partially using the one or more circuitries.

Other examples of the disclosure will be apparent to those skilled in the art from consideration of the specification and practice of the disclosure disclosed here. This application is intended to cover any variations, uses, or adaptations of the disclosure following the general principles thereof and including such departures from the present disclosure as come within known or customary practice in the art. It is intended that the specification and examples be considered as exemplary only.

It will be appreciated that the present disclosure is not limited to the exact examples described above and illustrated in the accompanying drawings, and that various modifications and changes can be made without departing from the scope thereof.

What is claimed is:

1. A method for motion field storage, comprising:

obtaining at least one motion vector of a first motion vector or a second motion vector, wherein a coding unit is geometrically partitioned into a first part of a geometric partition and a second part of the geometric partition for prediction in a geometric partitioning mode, and the first motion vector is from the first part and the second motion vector is from the second part;

determining a value of a stored motion vector type based on a motion index and a part index; and storing a motion vector in a corresponding motion field based on the value of the stored motion vector type, wherein the motion vector comprises the first motion vector, the second motion vector or a combined motion vector obtained based on the first motion vector and the second motion vector, wherein the geometric partitioning mode is intra and inter prediction, in response to determining that the value of the stored motion vector type is 2, storing a motion vector of inter partition in a corresponding motion field, wherein in a case that the first part of the geometric partition is an intra partition and the second part of the geometric partition is an inter partition, in response to determining that the value of the stored motion vector type is 0, storing no motion vector in the corresponding motion field, or in response to determining that the value of the stored motion vector type is 1, storing the motion vector of the inter partition in the corresponding motion field, wherein the motion vector of the inter partition is the second motion vector.

2. The method of claim 1, wherein determining the value of the stored motion vector type based on the motion index and the part index comprises:

determining the value of the stored motion vector type based on a blending width, the motion index and the part index, wherein a value of the blending width depends on a blending width index, and wherein the part index depends on an angle index.

3. The method of claim 1, further comprising:

storing the first motion vector or the second motion vector as a uni-prediction motion vector in a corresponding motion field.

4. The method of claim 1, wherein in a case that the first part of the geometric partition is an inter partition and the second part of the geometric partition is an intra partition, in response to determining that the value of the stored motion vector type is 0, storing the motion vector of the inter partition in the corresponding motion field, wherein the motion vector of the inter partition is the first motion vector, or in response to determining that the value of the stored motion vector type is 1, storing no motion vector in the corresponding motion field.

5. An apparatus, comprising:

one or more processors; and a memory coupled to the one or more processors and configured to store instructions executable by the one or more processors, wherein the one or more processors, upon execution of the instructions, are configured to perform operations comprising:

obtaining at least one motion vector of a first motion vector or a second motion vector from the bitstream, wherein a coding unit is geometrically partitioned into a first part of a geometric partition and a second part of the geometric partition for prediction in a geometric partitioning mode, and the first motion vector is from the first part and the second motion vector is from the second part;

determining a value of a stored motion vector type based on a motion index and a part index; and storing a motion vector in a corresponding motion field based on the value of the stored motion vector type, wherein the motion vector comprises the first motion vector, the second motion vector or a combined motion vector obtained based on the first motion vector and the second motion vector, wherein the geometric partitioning mode is intra and inter prediction, in response to determining that the value of the stored motion vector type is 2, storing a motion vector of inter partition in a corresponding motion field, wherein in a case that the first part of the geometric partition is an intra partition and the second part of the geometric partition is an inter partition, in response to determining that the value of the stored motion vector type is 0, storing no motion vector in the corresponding motion field, or in response to determining that the value of the stored motion vector type is 1, storing the motion vector of the inter partition in the corresponding motion field, wherein the motion vector of the inter partition is the second motion vector.

6. The apparatus of claim 5, wherein the operations further comprise:

determining the value of the stored motion vector type based on a blending width, the motion index and the part index, wherein a value of the blending width depends on a blending width index, and wherein the part index depends on an angle index.

7. The apparatus of claim 5, wherein in a case that the first part of the geometric partition is an inter partition and the second part of the geometric partition is an intra partition, in response to determining that the value of the stored motion vector type is 0, storing the motion vector of the inter partition in the corresponding motion field, wherein the motion vector of the inter partition is the first motion vector, or in response to determining that the value of the stored motion vector type is 1, storing no motion vector in the corresponding motion field.

8. A method for storing a bitstream, comprising:

generating a bitstream using an encoding method, and storing the bitstream on a non-transitory computer-readable storage medium, wherein the encoding method comprises:

obtaining at least one motion vector of a first motion vector or a second motion vector, wherein a coding unit is geometrically partitioned into a first part of a geometric partition and a second part of the geometric partition for prediction in a geometric partitioning mode, and the first motion vector is from the first part and the second motion vector is from the second part;

determining a value of a stored motion vector type based on a motion index and a part index; and storing a motion vector in a corresponding motion field based on the value of the stored motion vector type, wherein the motion vector comprises the first motion vector, the second motion vector, or a combined motion vector obtained based on the first motion vector and the second motion vector, wherein the geometric partitioning mode is intra and inter prediction, in response to determining that the value of the stored motion vector type is 2, storing a motion vector of inter partition in a corresponding motion field, wherein in a case that the first part of the geometric partition is an intra partition and the second part of the geometric partition is an inter partition, in response to determining that the value of the stored motion vector type is 0, storing no motion vector in the corresponding motion field, or in response to determining that the value of the stored motion vector type is 1, storing the motion vector of the inter partition in the corresponding motion field, wherein the motion vector of the inter partition is the second motion vector.

9. A non-transitory computer-readable storage medium for storing program instructions executable by a processor, for storing a bitstream generated by the method according to claim 1.

* * * * *